(12) United States Patent
Newson et al.

(10) Patent No.: US 9,482,539 B2
(45) Date of Patent: Nov. 1, 2016

(54) PROBABILISTIC MAP MATCHING FROM A PLURALITY OF OBSERVATIONAL AND CONTEXTUAL FACTORS

(71) Applicant: Microsoft Technology Licensing, LLC, Redmond, WA (US)

(72) Inventors: Paul E. Newson, Kirkland, WA (US); John C. Krumm, Redmond, WA (US); Eric J. Horvitz, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/145,555

(22) Filed: Dec. 31, 2013

(65) Prior Publication Data

US 2014/0114563 A1   Apr. 24, 2014

Related U.S. Application Data

(62) Division of application No. 12/816,496, filed on Jun. 16, 2010, now Pat. No. 8,645,061.

(51) Int. Cl.
*G01C 21/30* (2006.01)
*G01C 21/34* (2006.01)

(52) U.S. Cl.
CPC ........... *G01C 21/30* (2013.01); *G01C 21/3484* (2013.01)

(58) Field of Classification Search
CPC .............. G01C 21/30; G01C 21/3484; G01C 21/3492; G01C 21/3617; G01C 21/20; G01C 21/34; G01C 21/005; G01C 21/206; G01C 21/26; G08G 1/096888; G08G 1/0969; G08G 1/164; G01S 19/48; G01S 5/0294; G01S 19/39; G01S 19/49; G01S 5/0205; G01S 5/0226; G01S 5/0236; G01S 5/0252

USPC ....... 701/410, 414, 465, 425, 452, 467, 527, 701/530

See application file for complete search history.

(56) References Cited

U.S. PATENT DOCUMENTS 6,915,205 B2   7/2005   Kim et al.
7,519,564 B2   4/2009   Horvitz (Continued)

OTHER PUBLICATIONS

Hummel, "Map Matching for Vehicle Guidance (Draft)", retrieved on Apr. 6, 2010 at <<http://www.mrt.uni-karlsruhe.de/z/publ/download/hummel2006b.pdf>>, 2004, pp. 1-12.

(Continued)

*Primary Examiner* — Truc M Do
(74) *Attorney, Agent, or Firm* — Alin Corie; Sandy Swain; Micky Minhas

(57) ABSTRACT

Systems, methods, and devices are described for implementing map matching techniques relating to measured location data. Probabilistic models, including temporal Bayesian network models and Hidden Markov Models, may be used for combining multiple classes of evidence relating to potential locations of points traversed on routes over time. Multiple route segments and overall routes may be maintained under relative uncertainty as candidates. The candidate route segments and overall routes may then be reduced into a smaller number of candidates or a single most likely route as a trip progresses. As the trip progresses, route segments in proximity to each location point are identified and candidate matches are determined. A probability of an entity traversing a candidate match at a given time and a probability of an entity traversing between a first candidate match at a first time and a second candidate match at a second time are determined based on a plurality of factors. Different modalities may be used to measure and transmit the location data.

20 Claims, 9 Drawing Sheets

(56) References Cited

U.S. PATENT DOCUMENTS

| | | | |
|---|---|---|---|
| 7,661,065 B2 | 2/2010 | Nickolov et al. | |
| 7,912,628 B2 | 3/2011 | Chapman et al. | |
| 8,078,563 B2 | 12/2011 | Adachi et al. | |
| 8,090,524 B2 | 1/2012 | Chapman et al. | |
| 8,942,920 B1* | 1/2015 | Davidson | G01C 21/32 701/446 |
| 2003/0088411 A1 | 5/2003 | Ma et al. | |
| 2004/0102893 A1* | 5/2004 | Atkinson | H04W 4/02 701/117 |
| 2006/0106743 A1 | 5/2006 | Horvitz | |
| 2006/0235686 A1 | 10/2006 | Jeong et al. | |
| 2006/0271846 A1 | 11/2006 | Nickolov et al. | |
| 2006/0287842 A1 | 12/2006 | Kim | |
| 2007/0127378 A1* | 6/2007 | Yang | H04L 12/2602 370/235 |
| 2007/0208492 A1 | 9/2007 | Downs et al. | |
| 2007/0208498 A1 | 9/2007 | Barker et al. | |
| 2007/0282621 A1 | 12/2007 | Altman et al. | |
| 2007/0299599 A1* | 12/2007 | Letchner et al. | 701/200 |
| 2008/0004802 A1* | 1/2008 | Horvitz | 701/209 |
| 2008/0033652 A1 | 2/2008 | Hensley et al. | |
| 2008/0071465 A1* | 3/2008 | Chapman | G01C 21/3691 701/117 |
| 2008/0120030 A1 | 5/2008 | Yamada | |
| 2008/0201073 A1 | 8/2008 | Adachi et al. | |
| 2009/0005972 A1 | 1/2009 | de Koning | |
| 2009/0177644 A1 | 7/2009 | Martinez et al. | |
| 2009/0201149 A1 | 8/2009 | Kaji | |
| 2009/0210388 A1* | 8/2009 | Elson et al. | 707/3 |
| 2010/0014616 A1 | 1/2010 | Coulson | |
| 2010/0070170 A1 | 3/2010 | Adachi et al. | |
| 2010/0185388 A1 | 7/2010 | Horvitz | |
| 2010/0250497 A1* | 9/2010 | Redlich et al. | 707/661 |
| 2010/0312470 A1* | 12/2010 | Chen | G06F 17/30241 701/532 |
| 2010/0312472 A1 | 12/2010 | Hilbrandie et al. | |
| 2011/0241935 A1 | 10/2011 | Miocinovic et al. | |
| 2011/0313648 A1 | 12/2011 | Newson et al. | |

OTHER PUBLICATIONS

Krumm, Letchner, Horvitz, "Map Matching with Travel Time Constraints", retrieved on Apr. 6, 2010 at <<http://research.microsoft.com/en-us/um/people/jckrumm/Publications%202007/map%20matching%20HMM%2001%20web.pdf>>, SAE World Congress & Exhibition, Paper No. 2007-01-1102, Apr. 16, 2007, pp. 1-11.

Newson, Krumm, "Hidden Markov Map Matching Through Noise and Sparseness", retrieved on Apr. 6, 2010 at <<http://portal.acm.org/citation.cfm?id=1653771.1653818>>, ACM, Conference on Advances in Geographic Information Systems (GIS), Nov. 4, 2009, pp. 336-343.

Office action for U.S. Appl. No. 12/816,496, mailed on Jan. 23, 2012, Newson et al., "Probabilistic Map Matching From a Plurality of Observational and Contextual Factors", 12 pages.

Office action for U.S. Appl. No. 12/816,496, mailed on Jul. 26, 2013, Newson et al., "Probabilistic Map Matching From a Plurality of Observational and Contextual Factors", 7 pages.

Thiagarajan, Ravindranath, LaCurts, Madden, Balakrishnan, Toledo, Eriksson, "VTrack: Accurate, Energy-Aware Road Traffic Delay Estimation Using Mobile Phones", retrieved on Apr. 6, 2010 at <<http://db.csail.mit.edu/pubs/vtrack-sensys09.pdf>>, ACM, Conference on Embedded Networked Sensor Systems (SenSys), Nov. 4, 2009, pp. 85-98.

* cited by examiner

PROBABILISTIC MAP MATCHING FROM A PLURALITY OF OBSERVATIONAL AND CONTEXTUAL FACTORS

CROSS-REFERENCE TO RELATED APPLICATIONS

This application is a divisional of, and claims priority to, co-pending, commonly owned U.S. patent application Ser. No. 12/816,496, entitled "Probabilistic Map Matching From A Plurality Of Observational And Contextual Factors," filed on Jun. 16, 2010, which application is incorporated herein in its entirety by reference.

BACKGROUND

Map matching is a technique for determining a route based on location data received from one or more sensors. One type of location measuring mechanism, Global Positioning System ("GPS"), is widely used to determine real-time positioning of a particular person, vehicle, or any other entity capable of receiving a GPS signal. The location data received via GPS may be displayed on a digital map, which may include, for example, roads, buildings, and geographic landmarks. However, as GPS and digital maps are both prone to various errors, it is difficult to ensure that mobile positions identified via GPS are being registered properly on a digital map. As a result, an entity having a GPS sensor may be erroneously displayed on a digital map as moving through a building or moving across a body of water, or traversing an incorrect road. Although GPS data and other measured location data may not be entirely accurate, a map matching method may be useful for identifying a path or a road, for example, corresponding to the sensed geographic position. In addition, in response to receiving measured position data, a map matching method may further be utilized to reconstruct a route previously taken by an entity.

The road, path, and/or building identified by the map matching method may be inaccurate for a variety of reasons. For instance, in an urban setting, the map matching method may identify a plurality of streets in close proximity to the sensed position data. Therefore, for a vehicle having a GPS sensor, multiple candidate streets and measurement noise may make it difficult to determine the specific street being traversed. That is, a street identified as being the closest to the sensed position data might not be the street in which the vehicle is or was traveling. Moreover, simply matching each noisy sensed location point to the nearest path or road may also result in unreasonable and unlikely routes. If a real-time location displayed on a digital map is inaccurate, not only will a person be unaware of their respective location, but that person will also be unable to navigate to their final destination.

SUMMARY

Described herein are techniques for map matching utilizing probabilistic models, such as a Hidden Markov Model ("HMM"). In one embodiment, time-adjacent points at sensed locations are received and one or more routes between two of the points are identified. A relative probability of the one or more routes may be determined based on a combination of different factors. For instance, the relative probability may be based on a distance by comparing a direct "as the crow flies" distance between the two points and a total distance between the two points using each of the routes. The relative probability may also be based on time, velocity, historical information, an efficiency of a route, or a complexity of a network. In another embodiment, one or more of the identified routes may be removed if a distance between a particular point and a particular route or a distance between the direct distance and the total distance exceeds a predetermined, dynamic, or adaptive threshold. Alternatively, one or more of the identified routes may be removed if the computed probability falls below a threshold.

In another embodiment, a method describes collecting a plurality of time-adjacent points each corresponding to a particular geographic location. For each time-adjacent point, one or more candidate matches, such as route segments, in proximity to the geographic location may be identified. In this embodiment, a measurement probability that the time-adjacent points correspond to each of their respective candidate matches may be determined. Furthermore, a transition probability of moving from a first candidate match corresponding to a first-time adjacent point to a second candidate match corresponding to a second-time adjacent point may also be determined. In the above embodiment, the transition probability may be based on at least distance, time, velocity, information known about the entity or a region, efficiency of the route, the complexity of a network, or any combination thereof. In an additional embodiment, one or more sensed time-adjacent points may be deleted if a route may be predicted correctly without using the deleted points.

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is set forth with reference to the accompanying figures, in which the left-most digit of a reference number identifies the figure in which the reference number first appears. The use of the same reference numbers in the same or different figures indicates similar or identical items or features.

DETAILED DESCRIPTION

Figure 1:
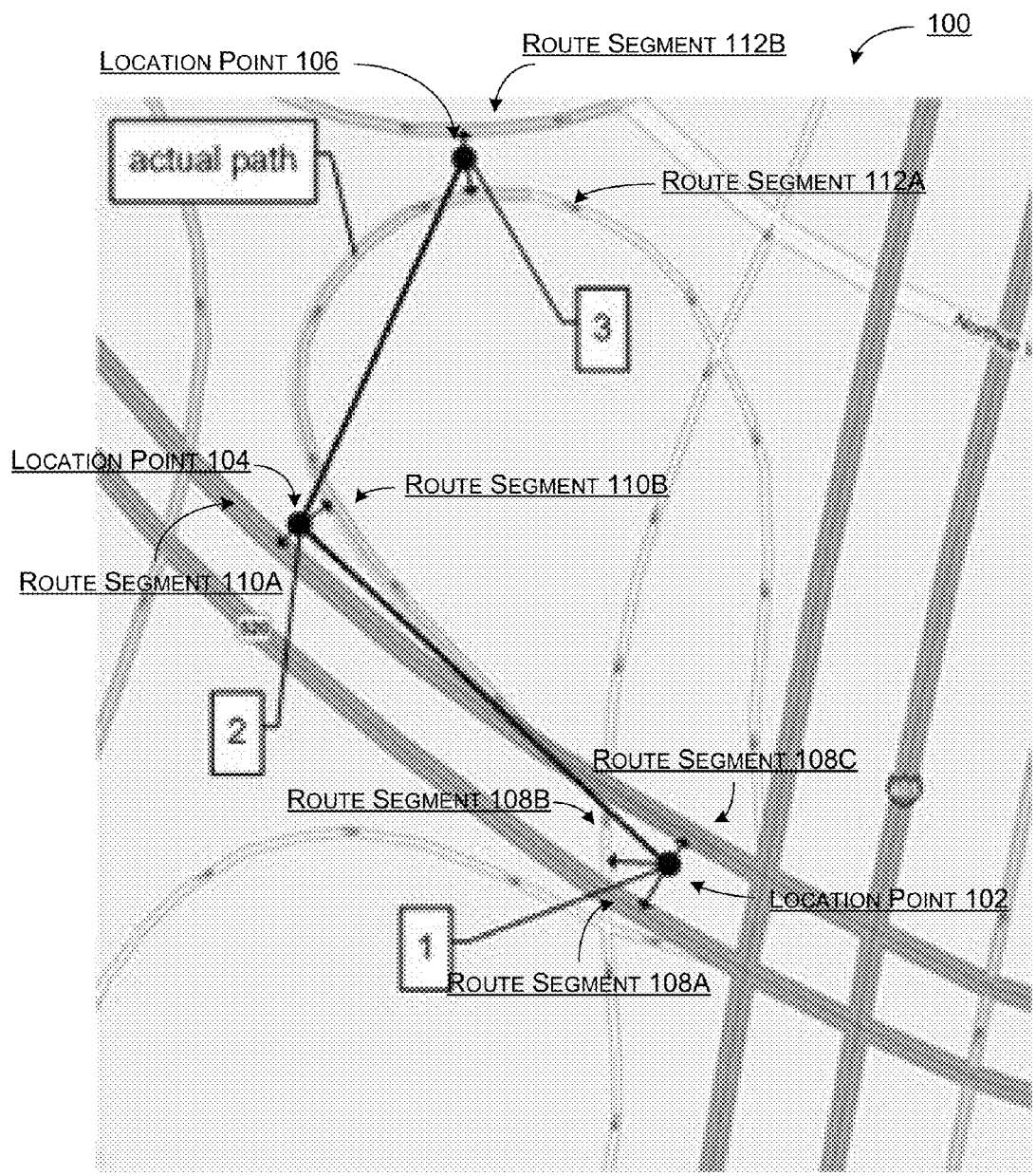
FIG. 1 illustrates a diagram showing digital map having a plurality of time-adjacent points each corresponding to a geographic location, in accordance with various embodiments.

Described herein are techniques for applying map matching methods using probabilistic models, such as a Bayesian network, logistic regression, or an HMM. As stated above, map matching is often used to either identify a route being traveled based on measured location data or to determine a route previously taken using a plurality of time-adjacent location points measured over a period of time. However, as both digital maps and various sensor types, such as GPS, may display or produce inaccurate data, previous map matching methods often produced erroneous results. One problem with previous map matching methods is that they often assumed that a road or path in closest proximity to a measured location point was the route segment being traversed. However, this route segment may not be the actual road or path being traversed. For instance, location points sensed in a densely populated area of a large city may each be within a few hundred meters of a plurality of different streets. Thus, due to inaccurate sensor data and/or inaccuracies in digital maps, selecting the road closest to the sensed location point may not produce the correct result. Additionally, merely matching each of a plurality of sensed and time-adjacent location points to the closest path or road would likely produce an inefficient and/or unlikely route. Therefore, described herein are procedures for determining the correct route being traversed by an entity having a location-sensing device.

More particularly, upon measuring or receiving a plurality of time-adjacent, sensed location points, a number of route segments in proximity to each of the location points may be identified. Moreover, a number of possible routes between a first time-adjacent location point and a second time-adjacent location point may also be determined. In one embodiment, a probabilistic model, such as an HMM may, for each of the identified route segments corresponding to a particular location point, compute a probability that an entity emitting the location data is actually traversing that route segment. Moreover, the HMM or other probabilistic model may further calculate a probability of traversing from one candidate match corresponding to a first location point to a second candidate match corresponding to a second location point. Such probabilities may be determined based on distance, time, velocity, historical information known about a specific entity, historical information known about the behavior of the environment or an entities' behavior in that environment, an efficiency of a route, or a complexity of a network of paths, and any combination thereof. Further, in order to reduce the number of candidate roads or paths associated with each sensed location point, the HMM or other probabilistic model may delete one or more of the route segments if they are over a predetermined distance from the sensed location point. Likewise, a sensed location point may also be removed from the input data if it is determined that it either adds no value to the computation of the most probable route, or actually makes the correct determination of the route more difficult or impossible.

Various examples of applying map matching methods using a HMM or other probabilistic models in accordance with the embodiments are described below with reference to FIGS. 1-7.

FIG. 1 illustrates a diagram that displays a digital map having a plurality of sensed location points and a plurality of candidate route segments each corresponding to one of the sensed location points. Although FIG. 1 relates to determining which roads a vehicle has traversed, the following discussion is not limited to vehicles traveling on roads. For instance, the roads could represent any type of path or route used for moving from one location to another in view of any type of constraint on movement, in which the constraint on movement could be total, partial, or probabilistic in nature. Likewise, the vehicle could also be any type of entity having any type of sensor. However, for the purposes of this discussion, FIG. 1 will be described in the context of vehicles traveling on roads.

It is contemplated that input data may be collected by any method or sensor whose output can be used to infer a location either directly or indirectly. For instance, and as stated above, location data may be measured utilizing any type of sensors, such as sensors configured to collect data by utilizing GPS, Wi-Fi, and/or cell tower multilateration, inertial navigation, dead reckoning, or any combination thereof. Moreover, data may be measured using sensors configured to collect data based the amount of light, temperature, altitude, atmospheric pressure, or any other method known in the art for measuring data.

As shown in FIG. 1, location point 102, location point 104, and location point 106 may represent measured time-adjacent location points. Location points 102-106 may be measured by any method known in the art that is capable of sensing a location of an entity, such as, for example, GPS, Wi-Fi, and/or cell tower multilateration, inertial navigation, dead reckoning, or any combination thereof. In one embodiment, the location data received may consist of vehicle locations measured by GPS. Each measured point 102-106 may consist of a time-stamped latitude/longitude pair. In this embodiment, location point 102 is the first data point received and location point 106 is the last data point received. That is, the vehicle was first measured at location point 102, then measured at location point 104 at a subsequent time, and lastly measured at location point 106.

Furthermore, FIG. 1 includes a plurality of different route segments that may correspond to roads or any type of path utilized to travel from one location to a second location. In this embodiment, each route segment corresponds to a particular road segment. The roads may be represented as a graph of nodes and edges whereby the nodes may be at intersections, dead ends, road name changes, etc., and the edges represent road segments between the nodes. Some edges may be directional to indicate one-way roads. Moreover, each node may have an associated latitude/longitude pair to indicate its location. Each edge may have a polyline of latitude/longitude pairs to represent its geometry. As shown, each of the route segments identified in FIG. 1 is in close proximity to a particular one of the location points 102-106. More specifically, route segments 108A-108C correspond to location point 102, route segments 110A and 110B correspond to location point 104, and route segments 112A and 112B correspond to location point 106.

Therefore, in view of the three time-adjacent GPS points (location points 102-106), it must be determined which roads the vehicle traversed and which overall route the vehicle traveled. In one embodiment, route segments in proximity to each of the location points 102-106 are first identified. More specifically, for each location point 102-106, one or more roads in proximity to the location point are identified. For instance, route segments 108A-108C have been identified as being in close proximity to location point 102. Thus, route segments 108A-108C may be viewed as potential candidate matches that the vehicle traversed. Similarly, route segments 110A and 110B are potential candidate matches for location point 104 and route segments 112A and 112B are potential road candidates for location point 106. However, as the vehicle could not have been traveling on more than one road at a particular time, and because each of the route segments are in relatively close proximity to each of the location points 102-106, it may be difficult to determine which road the vehicle actually traveled on.

FIG. 1 illustrates that merely selecting the route segment in closest proximity to a particular route segment 102-106 may result in determining an incorrect, inefficient, and/or unlikely driving route. In this embodiment, the actual path driven can likely be determined by identifying the three measured location points 102-106 while taking into consideration the roads displayed on the digital map. In this case, the driver appears to have been driving west on route segment 108C, which corresponds to location point 102. The driver then likely exited the highway on the road identified as route segment 110B. Based on the location of location point 106, the driver appears to have continued to curve to the right on this road, which is identified as route segment 112A.

However, in the above embodiment, location points 104 and 106 would be incorrectly matched if they each were associated with the nearest road. For example, FIG. 1 illustrates that route segment 110A is slightly closer to location point 104 than route segment 110B. If route segment 110A was instead chosen as the road being traversed, the driver would remain on the same route segment continuing west as opposed to taking route segment 110B towards location point 106. As the driver would need to turn around and drive the opposite direction back towards location point 106, this driving route is inefficient and unlikely. Likewise, with respect to location point 106, route segment 112B appears closer than route segment 112A. However, considering the driver likely traversed either route segment 110A or 110B at location point 104, the vehicle subsequently being on route segment 112B would lead to an unreasonable path. That is, the driver would need to take at least two different roads to reach route segment 112B, which results in an indirect driving route.

As shown above, merely selecting a route segment in closest proximity to a sensed location point may result in unreasonable routes possibly involving u-turns, inefficient looping, and bizarre driving behavior. To avoid unreasonable paths, knowledge of the connectivity of a network of routes or paths can be introduced and considered.

Figure 2A:
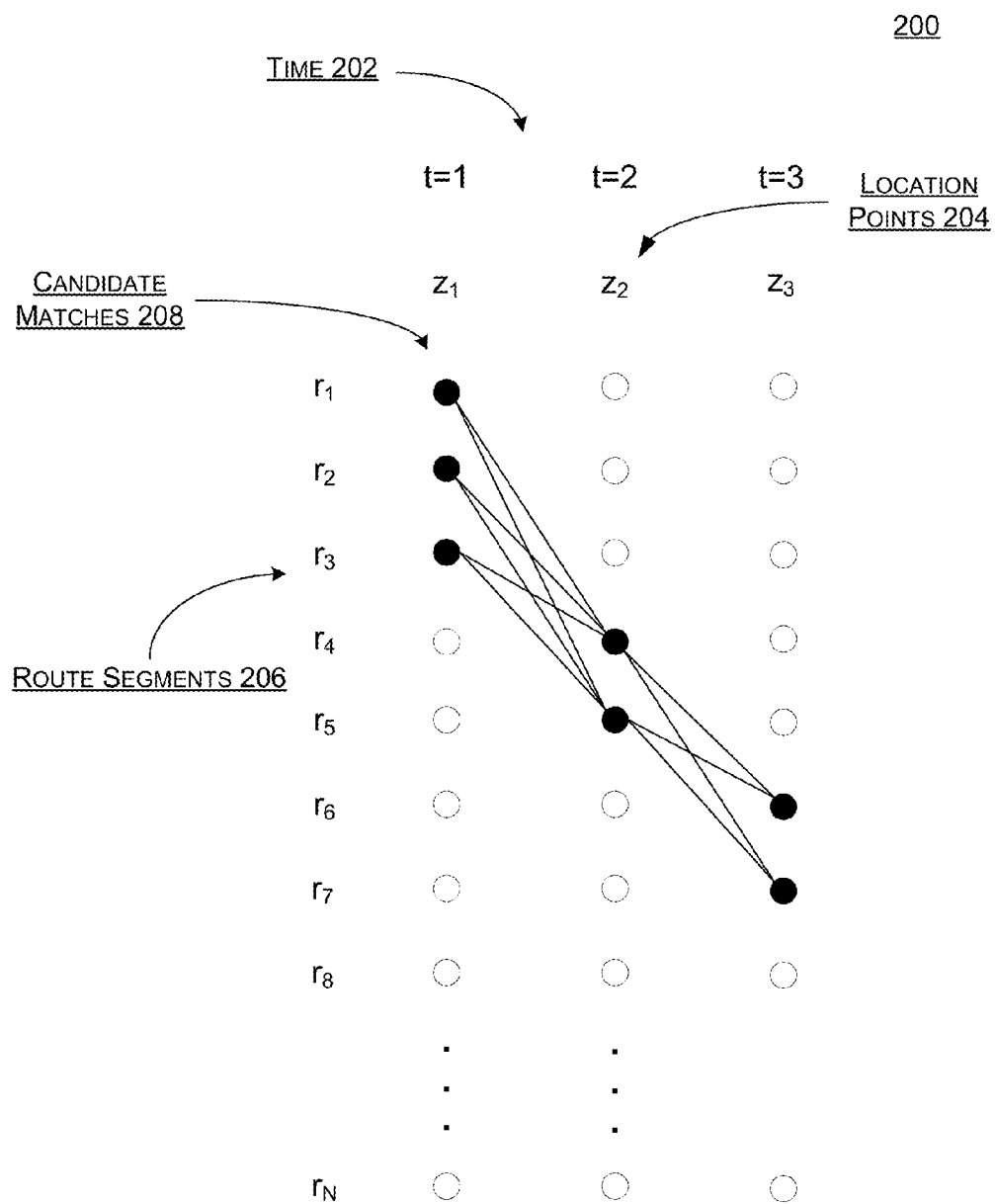
FIG. 2A illustrates a diagram showing a HMM table capable of computing probabilities based on a plurality of time-adjacent location points, route segments, and candidate matches, in accordance with various embodiments.

FIG. 2A illustrates a diagram for applying a HMM to the data described above and also illustrated in FIG. 1. The HMM 200 illustrated in FIG. 2A is an example probabilistic model and it is contemplated that any other probabilistic model, such as other HMMs, Bayesian models, and logistic regression, for example, may also be utilized. An HMM typically models processes that involve a path through many possible states, where some state transitions are more likely than others and where the state measurements are uncertain. In the map matching algorithm described herein, the states of the HMM may be the individual route segments and the state measurements may be the measured location points. To determine a correct route based on the location points, each location point may be matched with a plurality of route segments, with one being the correct route segment. Moreover, transitions between the different route segments may be governed by the connectivity of the network of route segments.

In one embodiment, time 202 refers to three different instances in time, represented by t=1, t=2, and t=3. In this embodiment, t=1, t=2, and t=3 are associated with the specific times location points 102, 104, and 106, respectively, were actually measured. Location points 204 may be time-adjacent sensed location points representing a location of an entity at a certain time and are illustrated as $z_1$, $z_2$, and $z_3$. $z_1$ may correspond to location point 102, $z_2$ may correspond to location point 104, and $z_3$ may correspond to location point 106 of FIG. 1. The discrete states of the HMM 200 may be represented by route segments 206, in which $r_1$-$r_N$ correspond to the different route segments illustrated in FIG. 1. In one embodiment, route segments $r_1$, $r_2$, and $r_3$ shown in FIG. 2 correspond to route segments 108A, 108B, and 108C, respectively, illustrated in FIG. 1. Likewise, route segments $r_4$ and $r_5$ correspond to route segments 110A and 110B, respectively, and route segments $r_6$ and $r_7$ correspond to route segments 112A and 112B, respectively. Candidate matches 208 may refer to route segments 206 in proximity to a particular location point 204 measured at a particular time 202. HMM 200 is an example implementation of an HMM and, therefore, HMM 200 may include any number of times 202, location points 204, route segments 206, and candidate matches 208.

In various embodiments, each vertical column of the HMM 200 may represent a point in time 202 corresponding to a measured location point 204 for the three times t=1, t=2, and t=3. At each of these times 202, HMM 200 may display one or more candidate matches 208 that represent route segments 206 in proximity to each location point 204. In HMM 200, each of the candidate matches 208 is represented by a circle. For instance, at t=1, there are three candidate matches 208 (route segments 108A-108C represented by $r_1$-$r_3$) in proximity to $z_1$ (location point 102), which are shown as three black circles in the first column. In the context of driving a vehicle, HMM 200 indicates that there are three roads in close proximity to sensed location point 102. At t=2, there are two candidate matches 208 (route segments 110A and 110B represented by $r_4$ and $r_5$) in proximity to $z_2$ (location point 104), which are represented as two black circles in the second column. Likewise, at t=3, HMM 200 also illustrates two candidate matches 208 (route segments 112A and 112B represented by $r_6$ and $r_7$) in proximity to $z_3$ (location point 106), which are shown as two black circles in the third column.

In the above embodiment, the three black circles, and the solid lines connecting the black circles, in column 1 indicate that a feasible path exists between each of route segments $r_1$-$r_3$ (route segments 108A-C) and the two candidate matches 208 for t=2 (route segments 110A and 110B represented by $r_4$ and $r_5$) and t=3 (route segments 112A and 112B represented by $r_6$ and $r_7$). In other words, with respect to FIG. 1, for each of route segments 108A-108C, a vehicle would be able to travel from that particular road to the roads corresponding to route segments 110A and 110B and the roads corresponding to route segments 112A and 112B. Although, the driving path may not be direct, a driving path nonetheless exists between the above route segments.

Therefore, for each location point 204, HMM 200 may consider all route segments 206 in proximity to that location point 204 to identify candidate matches 208. Further, HMM 200 may also consider all transitions between the route segments 206. Using the location points 204, the route segments 206, and the determined candidate matches 208, HMM 200 may determine the likelihood that an entity emitting the location data traversed each of the route segments 206. Subsequently, HMM 200 may then identify the route that was actually traversed.

As stated above, a number of time-adjacent location points 204 may be received from a location sensor. The time-adjacent location points 204 may be measured using one of a variety of technologies, such as GPS, Wi-Fi, and/or cell tower multilateration, inertial navigation, dead reckoning, or any combination thereof. The location sensor may be implemented in a mobile device used by a person or the location sensor may also be incorporated into a vehicle, for example. Upon receiving the sensed location points 204, the techniques described herein may identify one or more route segments 206 that are in proximity to the sensed location points 204. As mentioned previously, provided the location points 204 were sensed from a vehicle, the route segments 206 (roads) are identified in order to help determine which road the vehicle previously traversed. In addition, the route segments 206 may be used to determine which road the vehicle is travelling on in real time.

Utilizing the data described in the preceding embodiment, HMM 200 may calculate a measurement probability that represents a likelihood that particular measurement resulted from a given state. More particularly, given a particular location point 204, HMM 200 may determine a measurement probability for each route segment 206 in proximity to that location point 204. The measurement probability represents a likelihood that the location point 204 would be observed if the entity emitting the location point 204 was actually traveling on that route segment 206. In other words, the measurement probability generated by HMM 200 represents a likelihood that a location point 204 was emitted from an entity traversing that particular route segment 206.

In an example embodiment, the measurement probability may be based on a plurality of different factors, including a combination thereof. In various embodiments, the measurement probability for each route segment 206 may be based on a distance between the location point 204 and the closest point on that particular route segment 206. More particularly, route segments 206 in closer proximity to a particular location point are more likely to have been traversed at the time the location point 204 was measured. For instance, in an urban setting, there is likely to be multiple roads in relative close proximity to a location point 204 sensed via GPS. Some of these roads may be within 200 meters of the GPS point whereas other roads may be much further away. Although GPS may sometimes provide inaccurate data, there is a higher likelihood that the GPS point was emitted from a road relatively close to the measured GPS point. Moreover, considering distance alone, roads similarly distanced from the GPS point are likely to have similar measurement probabilities. On the contrary, in a rural setting, the number of roads in proximity to a particular GPS point might be relatively few. Assume, for example, that only two roads are in proximity to a GPS point—a first road and a second road being fifty meters and one thousand meters, respectively, from the measured GPS point. Due to the relative distances of these two roads from the GPS point, the HMM 200 may assign a much higher measurement probability to the first road.

In some circumstances, HMM 200 may need to refer to factors other than distance when determining measurement probabilities for the route segments 206. As will be described in further detail, the measurement probabilities for each of the route segments 206 may be based on, for example, time, velocity, an efficiency of a route, historical information known about an entity, historical information known about an environment or an entity that has previously traversed through the environment, a complexity of a network, such as a road network, or any combination thereof. Moreover, it is contemplated that additional factors known in the art may also be considered.

Furthermore, referring back to FIG. 1, three different route segments 108A-108C have been identified as being candidate matches 208 for location point 102. Therefore, HMM 200 may generate a measurement probability for each of route segments 108A-108C. However, as route segments 108A-108C each appear to be a similar distance away from location point 102, using distance as the only criteria for determining the measurement probabilities may cause HMM 200 to calculate approximately similar measurement probabilities for each of route segments 108A-108C. In this situation, it may be unclear as to which route segment was the most likely to be traversed at a certain time. Therefore, HMM 200 may consider other factors such as a layout of the route segments, such as a road network, and time-adjacent location points before and/or after the location point in question. Such factors may cause the HMM 200 to determine that one route segment is much more likely to have been traversed than other route segments.

Although all route segments 206 may be identified for a particular location point 204, HMM 200 may reduce the number of candidate matches 208 and, therefore, also reduce the number of measurement probabilities calculated. It is contemplated that the number of candidate matches 208 may be reduced due to a plurality of different factors. Reducing the number of potential candidate matches 208 may save both time and cost for computing measurement probabilities for route segments that were unlikely to be traversed based on, for example, a distance between the location point 204 and the route segment 206. Accordingly, the HMM 200 may be configured to not match route segments 206 that are distant from the measured location point 204. The threshold distance for matching route segments 206 may be set to any distance from location point 204. For instance, the algorithm may set to zero the measurement probability for a route segment 206 that is more than 200 meters away from a location point 204. Potential candidate matches 208 that relate to route segments 206 that are too distant to the location point 204 to be considered are illustrated in FIG. 2A as unfilled circles.

In various embodiments, two or more time-adjacent location points 204 may be measured for a particular entity, such as a vehicle. As mentioned previously, each of these location points 204 has a list of route segments 206 in proximity to the location points 204 and one or more candidate matches 208, such as roads, that the entity could have been traversing at the time 202 that the location point 204 was measured. Moreover, as the entity has presumably traveled from a first location point 204 to a second location point 204, there is at least one, and likely multiple, routes between these two location points 204. In response to identifying multiple routes between two time-adjacent location points 204, the HMM 200 may then calculate a transition probability representing a probability of an entity traversing between the different candidate matches 208 at these two times. That is, the computed transition probability may represent a likelihood that a vehicle travels from a road segment corresponding to a first GPS point to a road segment corresponding to a second GPS point utilizing a particular route. Multiple different transition probabilities may also be calculated to represent a likelihood that the vehicle travels between different roads corresponding to the same two GPS points.

For instance, with respect to FIG. 2A, the HMM 200 may compute transition probabilities for each of the lines connecting candidate matches 208, which are represented by the black circles. In other words, a transition probability may be calculated for an entity moving between any one of the candidate matches 208 at time t=1 ($r_1$-$r_3$) to any one of the two candidate matches 208 identified at time t=2 ($r_4$ and $r_5$). Transition probabilities may also be calculated for transitions between candidate matches 208 from time t=1 to any one of the two candidate matches 208 at time t=3 ($r_6$ and $r_7$) and for transitions between candidate matches 208 at time t=2 ($r_4$ and $r_5$) and the candidate matches 208 identified at time t=3 ($r_6$ and $r_7$). That is, for any two of the candidate matches 208 identified by HMM 200, a transition probability representing the likelihood of traveling between two route segments 206 may be calculated. In various embodiments, it is also possible to compute transition probabilities between non-time adjacent candidate matches 208.

In various embodiments, the transition probabilities computed by the HMM 200 may be based on a variety of different factors such as, for example, distance, time, velocity, historical information known about an entity, a collection of entities, and the network in which the entities navigate, efficiency of a route, and the complexity of a network. Any one, all, or a combination thereof may be utilized to calculate the transition probabilities described above.

In one embodiment, transition probabilities may be determined based on a difference between the direct distance from a first location point 204 to a second location point 204 and the route distance between a candidate match 208 corresponding to the first location point 204 and a candidate match 208 corresponding to the second location point 204. Initially, the direct distance may be calculated by determining the total distance directly between the two location points 204. The direct distance may also be referred to as the Euclidian distance or the great circle distance, or the distance is also commonly referred to "as the crow flies." Then, an actual distance traveled between these two location points 204 using a particular route is determined. As an entity will tend to take the shortest and/or most efficient route between two location points 204, the smaller the difference between the direct distance and the route distance, the higher the likelihood that that particular route either has or will be chosen. In contrast, a larger difference between these two values will likely result in a more indirect route and, therefore, generate a transition probability representing a lower likelihood that this route was or will be selected.

The preceding example can be further described in the context of FIG. 1. In one embodiment transition probabilities may be computed for routes between location point 104 and location point 106. As stated above, the transition probabilities may be determined by comparing the direct distance between location points 104 and 106 and the route distance between road segments (110A and/or 110B) corresponding to location point 104 and road segments (112A and/or 112B) corresponding to location 106. In this embodiment, first assume that route segment 112A is the correct route segment for location point 106. Therefore, an entity may have either moved from route segment 110A or 110B to route segment 112A. Knowing this information, the direct distance and the route distance may then be determined.

In the above embodiment, the direct distance is represented by the straight line connecting location point 104 and location point 106. Moreover, the route distance between route segment 110B and route segment 112A is the total distance of the path between these two route segments, which is represented by the curved route entitled in FIG. 1 as "actual path." As shown, the difference between the direct distance and the route distance for the above route appears to be relatively small. Therefore, the transition probability for this route would represent a high likelihood that the route between route segment 110B and route segment 112A was selected. On the other hand, in order to travel from route segment 110A to route segment 112A, an entity would need to continue west on route segment 110A, either exit the highway or make a u-turn, and then proceed to back track until it reached route segment 112A. As this route is inefficient, less direct, and, therefore, less likely, the difference between the direct distance and the route distance for this route would be considerably greater. Accordingly, the transition probability would likely represent a lower likelihood that this route was selected.

Transition probabilities may also be computed based on time. More particularly, calculation of transition probabilities may be influenced by a difference between a hypothetical amount of time taken to traverse an optimal path between route segments 206 corresponding to two different location points 204 and the actual time taken to travel from the route segment 206 corresponding to the first location point 204 to the route segment 206 corresponding to the second location point 204. The optimal path may be based on a plurality of factors. For instance, the difference may represent an amount of time taken to traverse a route in addition to the time it would have taken traversing the shortest route between two location points 204. It is expected that a small difference between these two times would cause the HMM 200 to compute a transition probability representing that the route associated with the time taken has a high likelihood of being selected. On the contrary, a larger difference between these two times would suggest that the route taken was indirect and/or inefficient. Accordingly, the transition probability for a route having a larger difference would represent a lower likelihood that this route would be selected.

In various embodiments, transition probabilities may also be based on velocity. More particularly, transition probabilities may be based on a velocity of an entity at a particular measured location point. For instance, assume that at least two location points have been measured and the velocity of an entity at the time the first location point was measured is known. In this embodiment, the likelihood of the entity travelling from one or more candidate matches corresponding to the first location point to one or more candidate matches corresponding to the second location point may be determined based at least in part on such velocity.

In a different embodiment, the transition probabilities computed by HMM 200 may be based in part on historical information known about a particular entity. After considering such information, a route that initially appears to be unreasonable, inefficient, and/or unlikely may subsequently appear to be reasonable. As such, the transition probability would represent a higher likelihood that that particular route was chosen. An example implementation may involve an individual driving a vehicle. In view of this individual's various habits, personal preferences, etc., and knowledge of prior routes previously driven, GPS points that indicate that this individual chose an unlikely driving route may be explained and, thus, deemed to be reasonable. Therefore, the transition probability calculated for this unlikely driving route would represent a high likelihood that this driving route was actually selected. It is contemplated that any information known about an entity may be utilized to influence computed transition probabilities.

In various embodiments, the historical information may relate to the behavior of other entities who have previously navigated the same, or a similar region, of a network. The behavior of these entities may influence a transition probability relating to an entity that is currently traversing through the network. For instance, if it is observed that a plurality of entities consistently choose a particular route to navigate through a network, it may be more likely that another entity would select that particular route. This information may cause the HMM 200 to compute a higher transition probability. In another embodiment, information known about the region itself, such as a road network, may also be considered to influence transition probabilities. That is, even if there is no historical information known about a particular entity or driver, historical information relating to how other entities tend to navigate through a network of routes being considered, including information known about the region itself may be used to improve the accuracy of computing transition probabilities.

In the above embodiments, there are many explanations that could justify an unlikely driving route. In one embodiment, a particular person may prefer not to drive on highways or interstates. Therefore, an unlikely yet reasonable driving path may include a route that weaves through surface streets instead of taking a more direct route on a freeway. In another embodiment, an unlikely driving path may be explained by a parent dropping off a child to school in the morning before work. If the child's school was not situated somewhere in between the parent's home and their workplace, such a driving route may appear unreasonable at first glance but may be explained when considering this information. Although each possible scenario will not be explained herein, any information and/or explanation that causes an unlikely route to appear more reasonable is contemplated.

In addition, an efficiency of a route between location points 204 may also be considered when determining transition probabilities. The efficiency of a route may refer to the overall reasonableness of a route, which may influence the likelihood of whether that particular route either was or would be selected. In other words, the efficiency of a particular route may consider the total distance and/or time taken for that route compared to other routes, or the difficulty of that route compared to other routes. The efficiency of a route may also be represented as an integer or a variable that signifies whether a particular route was more efficient than another route. For instance, unlikely driving paths that result in a less efficient route may have a transition probability that represents a lower likelihood that this route was or will be selected. Instances that may suggest an unlikely driving path may include u-turns, taking an indirect route between two location points 204, driving one direction and then backtracking to the final destination, etc. However, as stated above, information known about a particular driver may cause an otherwise unlikely driving route to appear reasonable. The efficiency of a route may also take into account driving and/or traffic conditions and any other factor that may influence whether a particular route was reasonable considering the surrounding circumstances. For instance, a reasonable driver might choose to travel a longer distance in order to reduce the number of turns in the route, or to make a left turn at an intersection with a traffic light instead of one without, or to perform right turns instead of left turns.

Therefore, as stated above, multiple factors (i.e., distance, time, velocity, historical information, and efficiency of a route) may be considered when computing transition probabilities from one candidate match 208 to a second candidate match 208. HMM 200 may consider all, none, any one, or any combination of these factors when calculating transition probabilities. It is contemplated that the factors described above may also be considered when computing the measurement probabilities previously mentioned. Moreover, in various embodiments, one or more of the above factors may be weighted more heavily than others when computing transition probabilities. For instance, GPS points indicating a driving path taken from one's home to their workplace may be indirect and, therefore, appear to be unreasonable. Although the difference in distance and time described above may be large, and the route appears to be inefficient, these inefficiencies may be explained by information known about this individual. Thus, if this individual stops by his favorite doughnut shop on the other side of town on his way to work every weekday, this seemingly inefficient and unlikely driving path can be explained and may appear to be reasonable. Therefore, because this driving route appears to be unreasonable in view of the other factors described above, information known about this individual would likely be given more weight than the other factors in computing a transition probability for this route. Given this information, the likelihood of the above route being taken is relatively high. In additional embodiments, if a hypothesized route deviates from a predicted route, the HMM may assign a transition probability that represents a lower probability that this route was or will be selected.

As illustrated in FIG. 2A, the HMM 200 may identify a plurality of candidate matches 208 that represent potential routes or paths between a route segment 206 in proximity to a first location point 204 measured at a first time 202 and a route segment 206 in proximity to a second location point 204 measured at a second time 202. Transition probabilities may also be computed for each of the candidate routes. Yet, for some routes the transition probability may be very small, indicating that a likelihood of an entity traversing between route segments 206 corresponding to the two location points 204 is very unlikely. Rather than continuing to search for a route that is likely to be incorrect, the HMM 200 may remove the candidate route from consideration. In some embodiments, the HMM 200 may remove from consideration routes whose difference between the direct distance and the route distance exceeds a predetermined threshold. For instance, if the difference between a direct distance and the route distance for a particular route exceeds one thousand meters, this route may be eliminated. However, the foregoing threshold of one thousand meters is merely an example and one of ordinary skill in the art would understand that any threshold distance may be used. The HMM 200 may also disregard one or more routes whose respective transition probability falls below a threshold. For instance, a route may be removed from consideration if its transition probability was 0.001 or less. However, as stated above, it is contemplated that the threshold may be set to any number.

Reducing the number of hypothesized routes being considered by the HMM 200 may minimize the number of candidate matches 208 to be computed, which may consequently lower the time, cost, and resources needed to determine the correct route currently or previously taken. It is contemplated that any other methods to reduce the number of candidate routes may also be utilized by HMM 200.

Figure 2B:
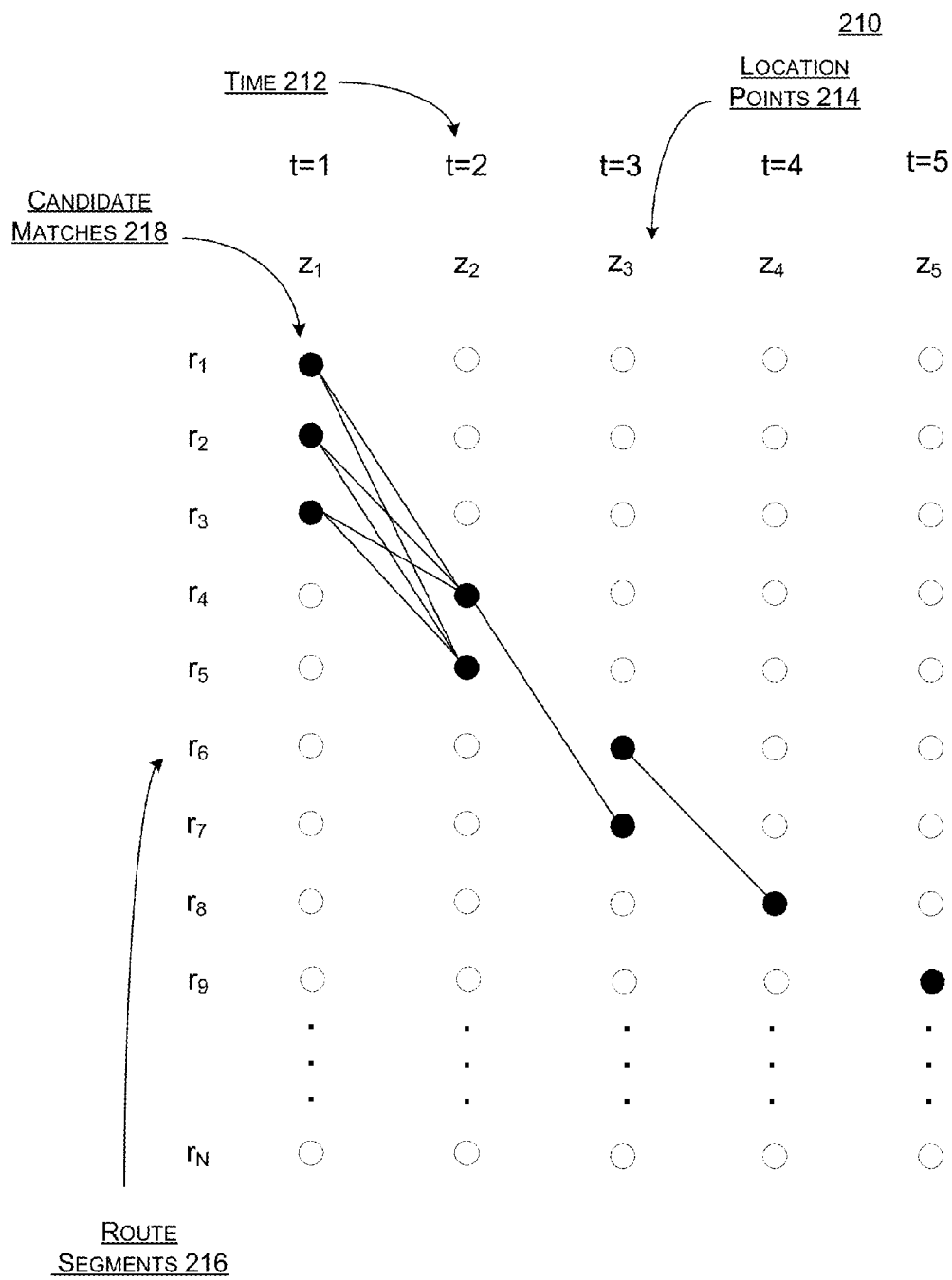
FIG. 2B illustrates a diagram showing the removal of time-adjacent location points and route segments utilizing a HMM table, in accordance with various embodiments.

FIG. 2B illustrates a HMM 210 that may eliminate one or more measured location points and/or identified routes between two or more of the location points 214. The HMM 210 is similar to HMM 200 illustrated in FIG. 2A. However, various differences between the two HMM tables are described below.

In one embodiment, time 212 refers to five different instances in time, represented by t=1, t=2, t=3, t=4, and t=5. In this embodiment, t=1, t=2, t=3, t=4, and t=5 are associated with the specific times in which a different location point 214 was measured. Location points 214 may be time-adjacent sensed location points representing a location of an entity and are illustrated as $z_1$, $z_2$, $z_3$, $z_4$, and $z_5$. $z_1$-$z_5$ may correspond to five different location points similar to the location points 102-106 shown in FIG. 1. The discrete states of the HMM 210 may be represented by route segments 216, in which $r_1$-$r_N$ each correspond to the different route segments 216. Candidate matches 218 may refer to route segments 216 in proximity to a particular location point 214 measured at a particular time 212. HMM 210 is an example implementation of an HMM and, therefore, HMM 210 may include any number of times 212, location points 214, route segments 216, and candidate matches 218.

In various embodiments, each vertical column of the HMM 210 may represent a point in time 212 corresponding to a measured location point 214 for the five times t=1, t=2, t=3, t=4, and t=5. At each of these times 212, HMM 210 may display one or more candidate matches 218 that represent route segments 216 in proximity to each location point 214. In HMM 210, each of the candidate matches 218 is represented by a circle. For instance, at t=1, there are three candidate matches 218 in proximity to $z_1$, which are shown as three black circles in the first column. At t=2 and t=3, there are two candidate matches 218 in proximity to $z_2$ and $z_3$, respectively, which are represented as two black circles in the second and third columns. Likewise, at t=4 and t=5, HMM 210 illustrates one candidate match 218 in proximity to each of $z_4$ and $z_5$, which are shown as one black circle in each of the fourth and fifth columns. Moreover, the black circles, and the solid lines connecting the black circles, in columns 1-5 indicate that a feasible path exists between the route segments 216 corresponding to the candidate matches 218.

In the foregoing embodiment, a difference between HMM 210 and HMM 200 is that HMM 210 includes two additional location points 214 ($z_4$ and $z_5$) at two times 212 (t=4 and t=5), each having a single candidate match 218. An additional difference is the possible transitions or routes between each of the candidate matches 218. For instance, there is only one potential route between the candidate match 218 corresponding to $z_2$ and $r_4$ and other candidate matches 218—the candidate match 218 corresponding to $z_3$ and $r_7$. Moreover, the candidate matches 218 corresponding to $z_2$ and $r_5$, $z_3$ and $r_7$, and $z_4$ and $r_8$ are not connected to any other candidate matches 218 subsequent in time 212.

As stated above, various route segments 216 and candidate matches 218 may be eliminated from the HMM 210 if they are over a predetermined distance from a particular location point 214. However, location points 214 may also need to be eliminated from the HMM 210 in order to determine the correct route previously or currently being traversed. These "bad" location points 214 may arise due to a variety of reasons, such as inaccurately measured location points and/or inaccuracies associated with a particular digital map. For instance, as shown by FIG. 2B, a complete path across the HMM 210 does not exist. That is, an entity would not be able to travel from any one of the candidate matches 218 associated with time 212 t=1 to the candidate match 218 associated with time 212 t=5. In particular, neither the candidate matches 218 for location point $z_3$ nor location point $z_4$ include a path to the candidate match 218 associated with location point $z_5$. Accordingly, HMM 210 shows that there is a break between the candidate matches 218 associated with location point $z_2$ and the candidate match 218 associated with $z_5$.

In one embodiment, the break in HMM 210 may be healed by removing location points 214 that prevent a complete path through the HMM 210. That is, when a break is detected between two different times 212, measured location points 214 may be removed to determine if the break has been healed. The location points 214 may be removed one at a time or multiple location points 214 may be removed together. Moreover, the removal process may occur either manually or automatically. In one embodiment, as the candidate matches 218 associated with location points $z_3$ and $z_4$ cause a break in HMM 210, one or both of location points $z_3$ and $z_4$ may be removed. If the break is still present, additional location points 214 may be removed on either side of the break until the break is healed. However, if the break is not healed, it is determined whether the break is longer than a predetermined amount of time. If the break exceeds this time threshold, the remaining location point 214 data may be split into separate routes corresponding to the location points 214 on each side of the break. In this situation, the map matching methods described herein may be performed separately on the set of location points 214 on each side of the break.

Figure 2C:
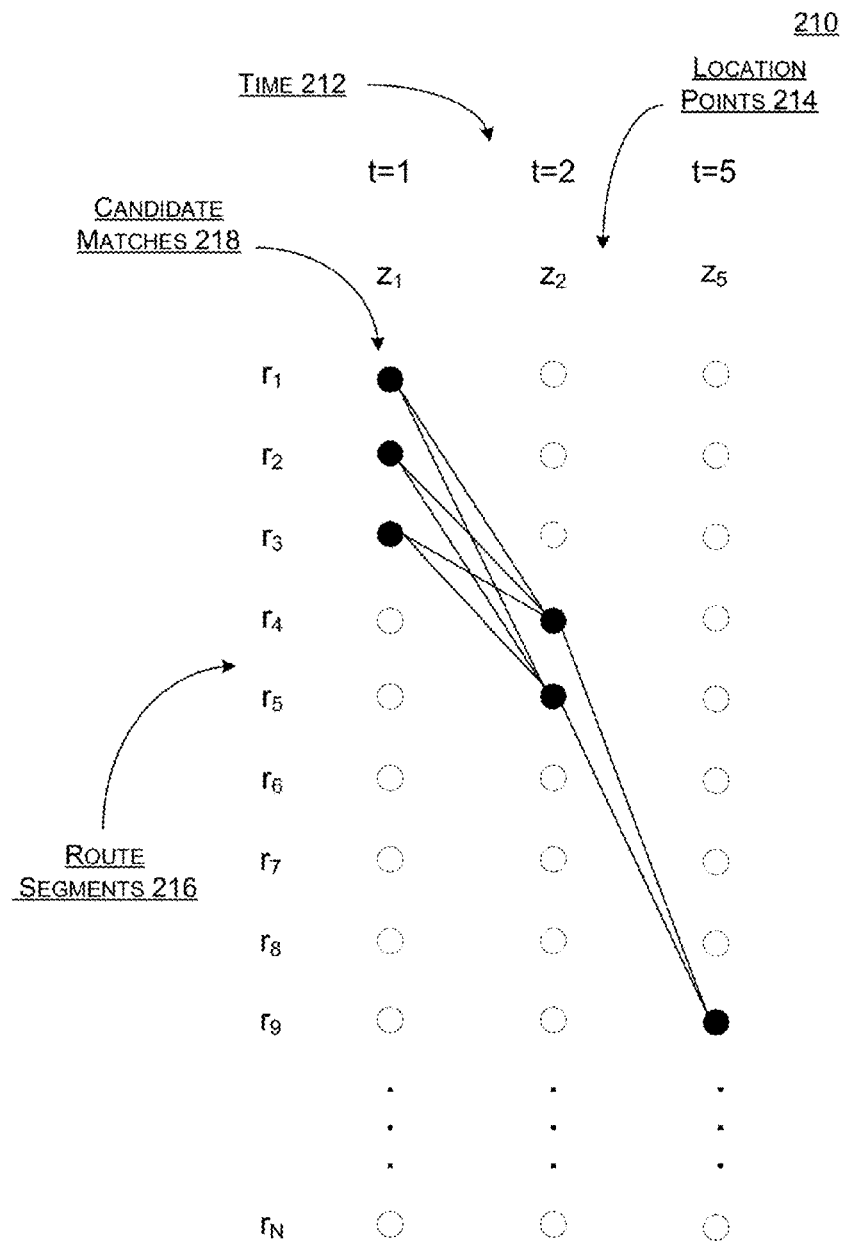
FIG. 2C illustrates a diagram showing an HMM after certain time-adjacent location points and route paths have been removed, in accordance with various embodiments.

FIG. 2C illustrates the same HMM 210 described in FIG. 2C but with various location points 214 being removed. In the preceding embodiment with respect to FIG. 2B, a break was identified in HMM 210. In order to heal the break, location points $z_3$ and $z_4$ were removed and it was then determined whether the break had been healed. In this embodiment, a path exists between each candidate match 218 corresponding to location point $z_2$ ($r_4$ and $r_5$) and the candidate match 218 associated with location point $z_5$ ($r_9$). Therefore, since there is now a complete path through HMM 210, the break has been healed and there is no need to remove additional location points 214. If for some reason the break had not been healed, the HMM 210 may continue eliminating location points 214 until a complete path exists across the HMM 210.

In various embodiments, one or more location points 214, such as measured GPS points, may be deleted from the measured location data if those location points 214 are not within a predetermined distance from a candidate match 218. This distance threshold may be set to any distance and may depend on the type of sensor being used and/or the type of area being traversed (urban versus rural, etc.). The above situation may arise when a vehicle is traveling on a road or within a parking structure, for example, that is not identified on a map. It may also arise if the GPS is experiencing a particularly high amount of noise, which may occur when a vehicle enters a tunnel or a natural or urban canyon. Once such location points 214 are removed, the HMM 210 may continue to assign probabilities to the candidate matches 218 and subsequently determine the correct route either currently being or previously been traversed.

FIGS. 3-6 describe various example processes for determining a route utilizing various map matching methods. The example processes are described in the context of the environment of FIGS. 1-2C, but are not limited to those environments. The order in which the operations are described in each example process is not intended to be construed as a limitation, and any number of the described blocks can be combined in any order and/or in parallel to implement each process. Moreover, the blocks in the FIGS.

3-6 may be operations that can be implemented in hardware, software, and a combination thereof. In the context of software, the blocks represent computer-executable instructions that, when executed by one or more processors, cause one or more processors to perform the recited operations. Generally, the computer-executable instructions may include routines, programs, objects, components, data structures, and the like that cause the particular functions to be performed or particular abstract data types to be implemented.

Figure 3:
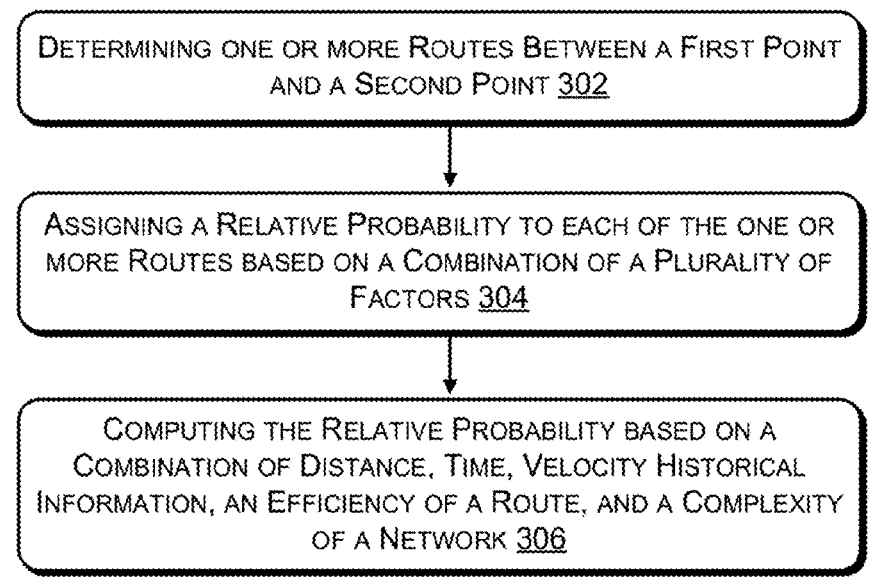
FIG. 3 illustrates a flowchart showing assigning probabilities to one or more routes between at least two measured location points, in accordance with various embodiments.

FIG. 3 is flowchart illustrating a method assigning relative probabilities to one or more routes between a first point and a second point. More particularly, block 302 illustrates determining one or more routes between a first point and a second point. As stated above, the first point and the second point may correspond to geographic locations measured using one of a plurality of types of sensors, such as sensors utilizing GPS, Wi-Fi, and/or cell tower multilateration, inertial navigation, dead reckoning, or any combination thereof. Moreover the one or more routes may consist of road segments connecting a first measured location to a second measured location.

Block 304 illustrates assigning a relative probability to each of the routes based on a combination of a plurality of factors. The plurality of factors may also be referred to as multiple classes of evidence. The relative probability may be computed independently or in a probabilistic manner considering the multiple classes of evidence using, for example, a temporal Bayesian network (also referred to as a dynamic Bayesian network) or a more simple HMM model. The relative probability for a particular one of the one or more routes may represent a likelihood that the route was or should be selected to travel between the first point and the second point.

Block 306 illustrates computing the relative probability based on a combination of distance, time, velocity, historical information, an efficiency of a route, and a complexity of a network. That is, the relative probability may be computed utilizing a combination of any of the foregoing factors and/or other factors known in the art. In various embodiments, the distance may relate to a difference between the direct distance and the route distance. As stated previously, the direct distance is the distance between two location points "as the crow flies" whereas the route distance may be computed by determining the distance needed to travel between two points using a particular route. Moreover, time may relate to a difference between a hypothetical time it takes to traverse the shortest route between two points and a measured time corresponding to a route actually taken between two points.

Furthermore, historical information may refer to data known about a particular entity being monitored, data known about other entities that have previously travelled through a region, such as a road network, and data about the region itself. This data may be used to determine whether a route taken by an entity is reasonable. Further, the known historical information may be utilized to determine whether a route that first appears to be unlikely, indirect, and/or inefficient is actually reasonable. For instance, assume that a particular driver generally refuses to drive on highways or interstates. In this context, if this driver selects a driving route that avoids a more direct route involving a highway in favor of a less direct and less efficient driving route using surface streets, the driving route would appear more likely than if this information were not known. In addition, the data known about a region may refer to any aspect of a region, such as speed limits for various road segments in a road network, historical traffic flows, the number of lanes of each road segment, etc.

In another embodiment, and as described previously, the efficiency of a route may relate to whether a particular route was reasonable given the surrounding circumstances. In addition, the relative probability may be determined based at least in part on a complexity of a network or route segments within a network.

In various embodiments, the relative probability of a route being selected may be inversely related to a distance between the direct distance and the total distance That is, the relative probability of a route being selected to move between a first location point and a second location point may be higher when the difference between the direct distance and the route distance is small. When this difference is relatively small, the actual route taken is likely to be more efficient and direct. On the other hand, as the difference between the direct distance and the route distance increases, the likelihood of an entity using that route decreases. Since the direct distance between two points will remain the same, an increased difference between these values indicates that a longer route is being taken between these same two points. Therefore, it logically follows that the relative probability will be lower for a route having a longer distance because an entity is more likely to use the shortest, most efficient, and/or most direct route to travel between two points.

In another embodiment, one or more routes may be disregarded when the difference between the direct distance and the route distance exceeds a predetermined threshold. Initially, a probabilistic model, such as an HMM, may consider all potential routes between two location points, which could amount to thousands of different routes. However, computing a relative probability for each of these routes may be computationally intensive, extremely time-consuming, and/or cost prohibitive. Accordingly, one may choose to limit the number of routes in which the probabilistic model needs to compute a relative probability. One way of limiting the number of routes is to disregard routes that have a large difference between the direct distance and the route distance. Eliminating such routes may make sense since routes having a large difference are likely to be less efficient and less direct and, therefore, more unlikely than routes having a small difference between the direct distance and the route distance. Thus, in foregoing embodiment, the probabilistic model may disregard routes that have a difference between the direct distance and the route distance that exceeds a predetermined threshold. It is contemplated that this threshold may be set to any distance, may be based on a variety of different factors, and it may be dynamic or adaptive.

Figure 4:
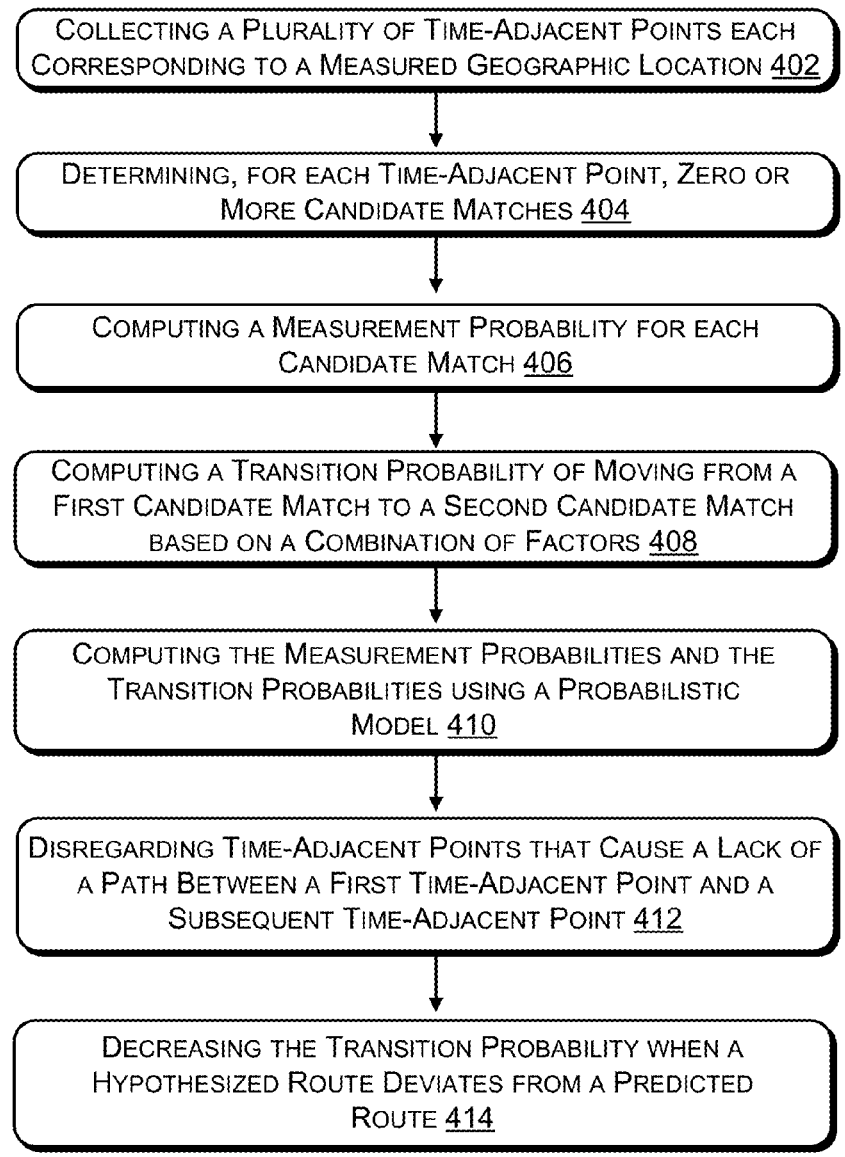
FIG. 4 illustrates a flowchart showing assigning measurement probabilities and transition probabilities for candidate matches between time-adjacent location points, in accordance with various embodiments.

FIG. 4 is flowchart illustrating a method for computing various probabilities relating to candidate matches in proximity to measured time-adjacent points. Specifically, block 402 illustrates collecting a plurality of time-adjacent points each corresponding to a measured geographic location. The plurality of time-adjacent points may be collected at any interval, such as every second, every ten seconds, every sixty seconds, etc. Moreover, each of the time-adjacent points may correspond to a measured geographic location representing a latitude/longitude pair. As mentioned previously, the time-adjacent points may be measured in any method known in the art, such as by using GPS, Wi-Fi, and/or cell tower multilateration, inertial navigation, dead reckoning, or any combination thereof.

Block 404 illustrates determining, for each time-adjacent point, zero or more candidate matches. The candidate matches for each time-adjacent point may comprise different paths, buildings, or road segments in proximity to the time-adjacent point in question. As stated above, it is contemplated that the number of candidate matches for a particular time-adjacent point may be zero. For instance, a point measured in a very rural environment may not have any corresponding candidate matches that are a reasonable distance from that point.

Block 406 illustrates computing a measurement probability for each candidate match. In various embodiments, the measurement probability represents a likelihood that an entity, such as a vehicle, has or will travel on that particular candidate match given the location measurement.

Block 408 illustrates computing a transition probability of moving from a first candidate match to a second candidate match based on a combination of a plurality of factors. In one embodiment, the transition probability represents a likelihood than an entity will travel from a first candidate match corresponding to a first location point to a second candidate match corresponding to a second location point subsequent in time from the first location point. It is contemplated that the first and second location points may or may not be time-adjacent location points. In other words, the transition probability may represent a likelihood of traveling from a first road segment corresponding to a first measured location point to a second road segment corresponding to a second measured location point subsequent in time to the first measured location point. As stated above with respect to FIG. 3, the factors may refer to any variable, such as, for example, distance, time, velocity, historical data relating to a particular entity, entities that have previously travelled through a network, and/or the network itself, the efficiency of a route, and the complexity of a network or a route segment within such a network.

As stated immediately above, the transition probabilities may be based on a combination of a plurality of factors. In an example embodiment, one of the plurality of factors may be the consideration of points, and/or candidate matches corresponding to those points, between a first point and a non-time-adjacent second point subsequent in time from the first point. For instance, assume that five time-adjacent points are measured for a particular route and that one or more transition probabilities are to be computed between candidate matches corresponding to the first point and candidate matches corresponding to the fourth point, in which the fourth point is subsequent in time from the first point. In this embodiment, the foregoing transition probabilities may be based at least in part on the second point and/or the third point, which were each measured between the times the first and the fourth point were measured. In addition, candidate matches corresponding to each of the second point and/or the third point may also be considered when computing transition probabilities of traveling between one or more candidate matches corresponding to the first point and candidate matches corresponding to the fourth point. It is also contemplated that any other point may be considered when computing transition probabilities.

Block 410 illustrates computing the measurement probabilities and the transition probabilities using a probabilistic model. As stated previously, the probabilities may be computed using any type of probabilistic model such as, for example, an HMM, a Bayesian Network, and/or other specialized approaches (i.e., logistic regression).

In various embodiments, a probabilistic model and/or a plurality of factors may be used to identify candidate route segments and/or routes and to reduce the number of candidates into more probable route segments and/or a single most likely route. In various embodiments, a probabilistic model described above and/or the plurality of factors may be used to generate or identify candidate route segments and/or overall routes associated with a plurality of time-adjacent points. The route segments may correspond to a potential path between any two points that may or may not be time-adjacent points. Moreover, an overall route may represent a potential route between a point corresponding to a beginning location of a route and a point corresponding to a final destination of a route.

In one embodiment, the candidate route segments and/or overall routes may be generated or identified either before an entity begins a route and/or during the route. Further, each of the candidate route segments and/or overall routes may be assigned a score representing a likelihood that the candidate route segments and/or overall routes either will be, or is currently being, traversed. Accordingly, as the scores are being computed either before a route is travelled or in real-time, the scores may represent some uncertainty with respect to the route segment and/or route that will be taken. The level of uncertainty may vary based on the plurality of factors. For instance, in a rural environment, a relatively few number of paths between two location points may cause greater certainty for one or more of the candidate routes. In contrast, in an urban setting, in which there may be more available routes between two points, the level of uncertainty of an entity choosing a particular route segment and/or route may be greater. The efficiency of various candidate route segments and/or routes may also influence the score for a particular route.

In an example embodiment, the number of candidate route segments and/or overall routes may be reduced as a path progresses. More particularly, the number of candidate route segments and/or overall routes may be reduced into a lesser number of more probable route segments and/or a single most likely route, respectively, as the path currently being taken is determined. For instance, if a driver begins on a path heading in a particular direction, route segments and overall routes that are consistent with that path may become more likely. On the other hand, candidate route segments and/or overall routes that differ from the path being selected may become increasingly unlikely.

Therefore, in one embodiment, the number candidate route segments and/or routes may be decreased by disregarding route segments or routes that appear to be unlikely. As the path progresses, additional route segments and routes may also become more or less likely until a few candidate route segments remain. Likewise, a single most likely candidate route may be identified due to its similarity to the path currently being traversed. Moreover, additional candidate route segments and routes that may have initially appeared unlikely may become increasingly more likely as the path actually taken become known. That is, the mostly likely candidate route segments and/or the one or more most probable overall routes may be determined in real-time by monitoring a path currently being taken by a particular entity.

Block 412 illustrates disregarding time-adjacent points that cause a lack of a path between a first time-adjacent point and a subsequent time-adjacent point. As described above with respect to FIGS. 2B and 2C, one or more measured location points may be inaccurate for a variety of different reasons. When determining a route taken based on a plurality of time-adjacent location points, such inaccurate location points may cause difficulties in computing the correct route. For instance, assuming three different location points have been measured, a scenario might exist in which there is no route or path between the second and third location points. Accordingly, due to the break between these location points, there would be no route connecting the first location point and the last location point. However, the second location point may be removed or disregarded if a route exists between the first location point and the third location point. Once this location point is disregarded, the correct route may be properly determined.

Block 414 illustrates decreasing the transition probability when a hypothesized route deviates from a predicted route. In one embodiment, assume that a route between two location points has been predicted as being relatively likely in view of other possible routes between these two points. However, if an entity traversing this route somehow deviates from the predicted route, the HMM or other probabilistic model will decrease the transition probability representing a lower likelihood that the predicted route will be traversed. For instance, if the predicted route was driving due north from location point A to location point B and the driver began driving east before arriving at location point B, it is very likely that the driver is no longer using the predicted route to drive to location point B. Therefore, the transition probability for the predicted route should be reduced.

Figure 5:
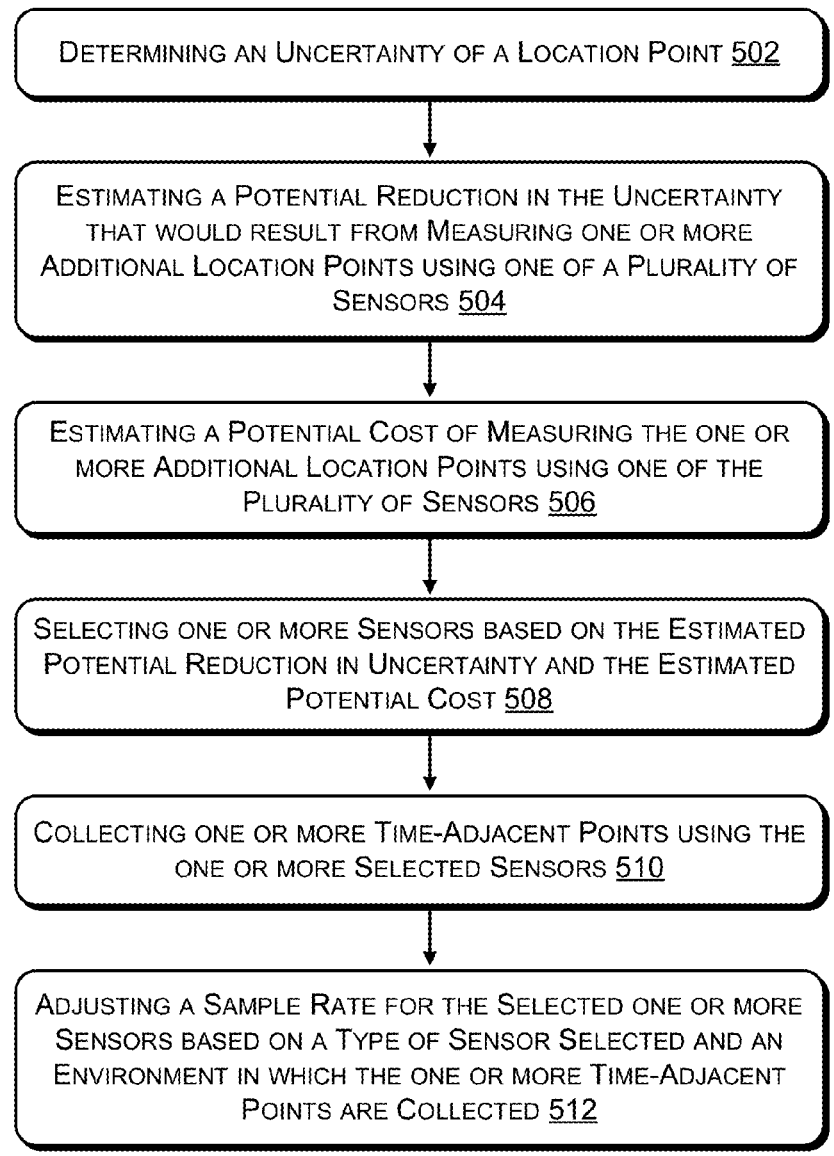
FIG. 5 illustrates a flowchart showing collecting a plurality of time-adjacent points based on selection of a type of sensor, in accordance with various embodiments.

FIG. 5 is a flowchart illustrating a method for selecting one or more sensors for collecting time-adjacent points. More particularly, block 502 illustrates determining an uncertainty of a location point. In one embodiment, the uncertainty may relate to a likelihood that a location point is precise and/or accurate. That is, the uncertainty may refer to a likelihood that the actual location of the sensor at the time of the measurement is within a certain distance from the measured location. Although a latitude/longitude pair may be identified for a particular location point, the actual exact location of the entity being measured may nonetheless be uncertain. In an example embodiment, uncertainty of a location point may occur due to the parameters used to measure the location point. For instance, a sensor that is turned on immediately prior to measuring the location point may be using parameters that are not the most appropriate to measure location data. Therefore, location points measured using these parameters may be inaccurate and, thus, uncertain.

The uncertainty may also be determined based on one or more of the factors described herein, such as distance, time, velocity, historical information, efficiency, and/or complexity of a network. For instance, the uncertainty may depend on a complexity of one or more road segments corresponding to the location point. In other words, a greater tolerance for uncertainty may be acceptable in a rural environment that has relatively few route segments in proximity to a particular location point as opposed to a densely populated urban environment that is likely to have an increased number in roads, paths, walkways, etc.

The uncertainty of a location point may also arise in the context of map matching. In an example embodiment, a series of location points for a particular entity may have been measured. For a particular one of the location points, a map matching algorithm and/or a probabilistic model may be able to identify two different route segments that an entity could be traversing based on the previously measured location points. As each of the two route segments may have a similar probability of being traversed by the entity, some uncertainty exists as to which route segment is actually being traversed. It is contemplated that the level of uncertainty may vary based on a variety of different factors. In one embodiment, the level of uncertainty may be reduced by switching modalities and utilizing different and/or additional sensors to measure location data.

Block 504 illustrates estimating a potential reduction in the uncertainty that would result from measuring one or more additional location points using one of a plurality of sensors. In various embodiments, the plurality of sensors may include any method or sensor whose output can be used to infer a location either directly or indirectly, or in combination with other sensors. For instance, the one or more additional location points may be measured utilizing any type of sensors, such as sensors configured to collect data by utilizing GPS, Wi-Fi, and/or cell tower multilateration, inertial navigation, dead reckoning, or any combination thereof. Moreover, data may be measured using sensors configured to collect data based the amount of light, temperature, altitude, atmospheric pressure, or any other method known in the art for measuring data. Moreover, the potential reduction in uncertainty may be caused by utilizing another sensor to measure the one or more additional location points and/or changing the parameters of a sensor currently being used to measure location data.

The estimated potential reduction in uncertainty may be determined when a combination of sensors are used to measure location points. In an example embodiment, if a particular measured location point corresponds to an entity traveling on an overpass, the entity could potentially be on two different roads—the road having the overpass or the road below the overpass. Therefore, there may an equal probability that the entity is traveling on each of these two roads. However, a combination of sensors may be used to determine which road the entity is actually traversing. For instance, if it were possible to accurately determine the altitude of the entity, such as by using an altimeter, one may be able to determine which road the entity is currently traversing. That is, if it was determined that the entity was situated at a certain altitude above the ground (i.e., 30 feet), it would be likely that the entity was traveling on the road having the overpass. Likewise, if a sensor accurately showed that the entity did not have any altitude above the ground, the entity would likely be travelling on the road passing underneath the overpass.

In various embodiments, the estimated potential reduction in the uncertainty may be based on the relative complexity of a network of candidate matches, such as paths or roads, for additional location points to be measured. As stated above, the number of roads in proximity to a person in a rural setting may be quite low. Therefore, because there are likely to be few candidate matches, one may opt to receive location data via cell tower multilateration in favor of GPS. On the contrary, receiving location data via cell tower multilateration in a dense urban setting may not result in location data having a level of accuracy that is sufficient to determine the actual route segment a person or vehicle is traversing. Accordingly, the estimated potential reduction in uncertainty may vary based on the type of sensor being used and the parameters that are set for a particular sensor given the complexity of a network.

In one embodiment, the estimated potential reduction in the uncertainty may also be based on the accuracy of the sensors available at a particular time. More particularly, it is generally known that, depending on the circumstances, GPS may provide more accurate location data than either Wi-Fi and cell tower multilateration, which both may or may not be available. However, precise location data may not be necessary in certain situations. For example, for a person walking or driving on a path or road in a rural area, there may be few, if any, paths or roads in proximity to that person. Therefore, obtaining just a few location points, regardless of whether the location points are accurate or not, may be sufficient to determine the route taken by that person. That is, in order to determine a location corresponding to where that person is, or previously has been, GPS may not be necessary to make such a determination. Alternatively, cell tower multilateration may obtain location data accurate enough to determine a location of the person or to reconstruct a route taken by that person considering the low likelihood of that person being on another road or path.

In another embodiment, assume a person is either walking or driving in a downtown area of a major city, otherwise known as an urban canyon. In this situation, there is likely to be a number of streets and buildings in close proximity to that person. At first glance, obtaining location data via GPS appears to be the most suitable for this environment. However, urban canyons and other terrestrial features may affect GPS signals, resulting in collecting GPS points that are gross outliers in comparison to other measured GPS points. Furthermore, using GPS in a dense urban environment to obtain location data may result in receiving extended sequences of erroneous location (GPS) points. Therefore, as there is likely to be an abundance of Wi-Fi hot spots in a downtown setting, utilizing Wi-Fi to obtain location data may be the most appropriate modality to determine that person's location.

In an additional embodiment, using GPS to obtain location data may often be the most reasonable choice. For instance, in a residential setting, a person may be surrounded by a large number of streets or paths in close proximity to that person. As Wi-Fi may be generally unavailable in this situation, and cell tower multilateration might not produce location data accurate enough to determine which road or path that person is traversing, GPS is likely the most appropriate modality. Therefore, the estimated potential reduction in uncertainty may be influenced by the accuracy of a sensor at a particular time.

Block 506 illustrates estimating a potential cost of measuring the one or more additional location points using one of the plurality of sensors. That is, cost relating to time, money, and/or energy may be another factor in determining which modality and/or parameters to use in order to measure location data. For instance, the cost of transmitting, collecting, and/or processing location data may be different depending on the type of sensor and/or parameters of a sensor being used. Thus, the estimated potential cost of obtaining additional location points using each of the different types of sensors may vary based on the amount resources needed to collect and process the data. In other embodiments, the potential cost of measuring additional location points may be estimated based on energy costs associated with a particular type of sensor. For example, measuring location data using GPS may expend more energy than collecting location data utilizing Wi-Fi or cell tower multilateration. Accordingly, one may consider using the most accurate modality, or combination thereof, to measure and obtain location data in view of power considerations.

Block 508 illustrates selecting one or more sensors based on the estimated potential reduction in uncertainty and the estimated potential cost. In one embodiment, the one or more sensors being selected to measure the additional location points may be based on a tradeoff between the estimated potential reduction in uncertainty of the location point and the estimated potential cost of measuring additional location points using each of the plurality of sensors. For instance, the one or more sensors that are selected may be selected based on balancing the surrounding circumstances. Such circumstances may include the ability of a sensor to obtain accurate location data while incurring a reasonable amount of cost. However, if either the estimated uncertainty or estimated cost is above acceptable levels for a particular sensor, a different sensor may be selected.

Block 510 illustrates collecting one or more time-adjacent points using the one or more selected sensors. In one embodiment, the one or more time-adjacent points may be measured using any method or sensor that is able to collect data in which a location can be inferred either directly or indirectly.

Block 512 illustrates adjusting the sample rate for the selected one or more sensors based on a type of sensor selected and an environment in which the one or more time-adjacent points are collected. For instance, parameters for the selected one or more sensors being used to collect location data may be adjusted such that the one or more sensors collect time-adjacent points either more or less frequently. In other words, the sensors may be adjusted to measure location points every one second, every ten seconds, every sixty seconds, and so forth, based on the type of sensor being used and the environment in which the location data is being measured. For instance, as stated above, as a vehicle moves from a rural environment to a more urban environment, the sample rate for the sensor being used may need to be increased to accurately determine which route segment the vehicle is traveling since the number of roads in proximity to the vehicle are likely to increase. That is, if the same sample rate was maintained (i.e., every thirty seconds), it may be difficult to determine the road segments that the vehicle is or was traversing.

It is contemplated that a particular sensor would be capable of dynamically choosing or changing the parameters currently being used to measure location data. Therefore, as measured location points become increasingly inaccurate, the sensor may adaptively change its parameters in order to obtain the most accurate location data in view of the surrounding circumstances.

In other embodiments, a particular sensor may be used to determine whether another sensor is failing to measure sufficiently accurate location data. For instance, if a sensor utilizing GPS is not collecting accurate data, or is failing altogether, another sensor may identify the inaccuracies and cause an entity to switch from collecting location data using GPS to measuring location data utilizing Wi-Fi or cell tower multilateration.

Figure 6:
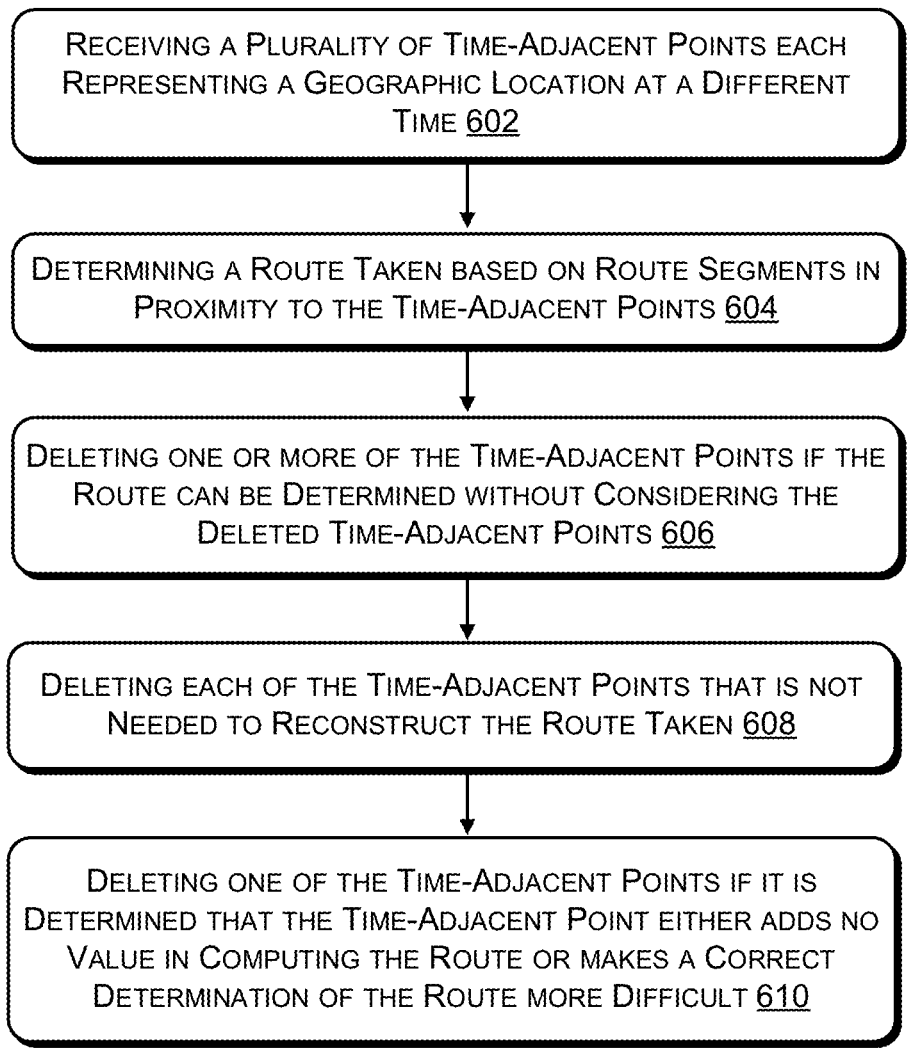
FIG. 6 illustrates a flowchart showing determining which time-adjacent points are needed to correctly determine a route, in accordance with various embodiments.

In various embodiments, it is contemplated that how and when the time-adjacent location points are measured may be adaptively changed based on the type of sensor being used. In other words, sensor noise parameters may be adjusted depending on the noise estimate for that particular sensor. As an example implementation, assume that a vehicle is utilizing GPS to measure location data but the vehicle then enters an urban canyon. As mentioned above, utilizing GPS in an urban canyon may result in measuring and receiving erroneous and/or inaccurate location data. In order to obtain accurate location data, the vehicle may then begin utilizing Wi-Fi to obtain more accurate location data. However, upon switching to a different modality, such as Wi-Fi, it may be difficult to determine which noise parameters will result in the most accurate location data. Therefore, the noise parameters may be either manually or automatically changed so that they are appropriate for measuring location data using the different modality, which in this case is Wi-Fi FIG. 6 is flowchart illustrating a method for determining which location data are necessary to correctly determine a particular route. Specifically, block 602 illustrates receiving a plurality of time-adjacent points each representing a geographic location at a different time. As stated previously, the time-adjacent points may be received via different modalities, such as utilizing GPS, Wi-Fi, and/or cell tower multilateration, inertial navigation, dead reckoning, or any combination thereof. Moreover, block 604 illustrates determining a route taken based on route segments in proximity to the time-adjacent points. That is, based on the measured location points taken at various time intervals, the route actually traveled can be determined. The determined route may or may not be determined by applying a HMM.

Block 606 illustrates deleting one or more of the time-adjacent points if the route can be determined without considering the deleted time-adjacent points. In other words, time-adjacent points may be deleted if removing those points does not affect correctly determining the route actually taken. For instance, assuming at least three time-adjacent location points have been measured, a previously taken route corresponding to these three location points may be determined. However, in some circumstances, the route may nonetheless be determined even if only two out of the three location points are considered. Accordingly, a particular one of the time-adjacent points can be deleted and it can then be determined whether the correct route is still computed. If so, that point will be deleted and the method may continue by identifying additional points that may also be deleted. If the correct route can no longer be determined, however, that time-adjacent point will remain. The number of location points that can be deleted while still being able to determine the actual route varies based on the type of route taken, the type of sensor being used, the frequency of collecting location points, and/or the type of location setting.

In some embodiments, one may only be able to delete a few location points, if any at all, when the route taken is less direct. That is, nearly every location point may be needed to reconstruct the correct route when the route involves an unlikely route. Moreover, a greater number of location points may be deleted when location points are being collected more frequently. For instance, additional location points may be deleted when location points are collected every second as opposed to every sixty seconds. Furthermore, additional location points may be deleted without affecting determining the route taken when there are few candidate matches associated with a particular location point, such as in a rural setting.

Block 608 illustrates deleting each of the time-adjacent points that is not needed to reconstruct the route taken. In an example embodiment, each location point that is not necessary to determine the route being taken may be removed. For instance, assume that one is driving from Tacoma, Wash. to Seattle, Wash. The most direct and efficient route involves proceeding north on Interstate 5 for approximately thirty miles. Assume further that a location point was measured every sixty seconds totaling approximately thirty location points for the duration of the route. In this embodiment, because driving on Interstate 5 is the most direct route and since the number of reasonable available routes is somewhat limited, one may delete a majority of the thirty location points and still be able to determine the route actually taken. In this case, each of the thirty time-adjacent location points that is not necessary to reconstruct the route from Tacoma to Seattle may be deleted.

Block 610 illustrates deleting one of the time-adjacent points if it is determined that the time-adjacent point either adds no value in computing the route or makes a correct determination of the route more difficult. In some embodiments, a sensor may measure a location point that is deemed to be inaccurate due to one of a variety of reasons. Therefore, this location point may not be useful in determining a route currently being traversed or a route previously taken. Likewise, an inaccurate location point may cause the route to be determined incorrectly. Accordingly, it may be useful to delete or disregard certain location points when determining a route.

Figure 7:
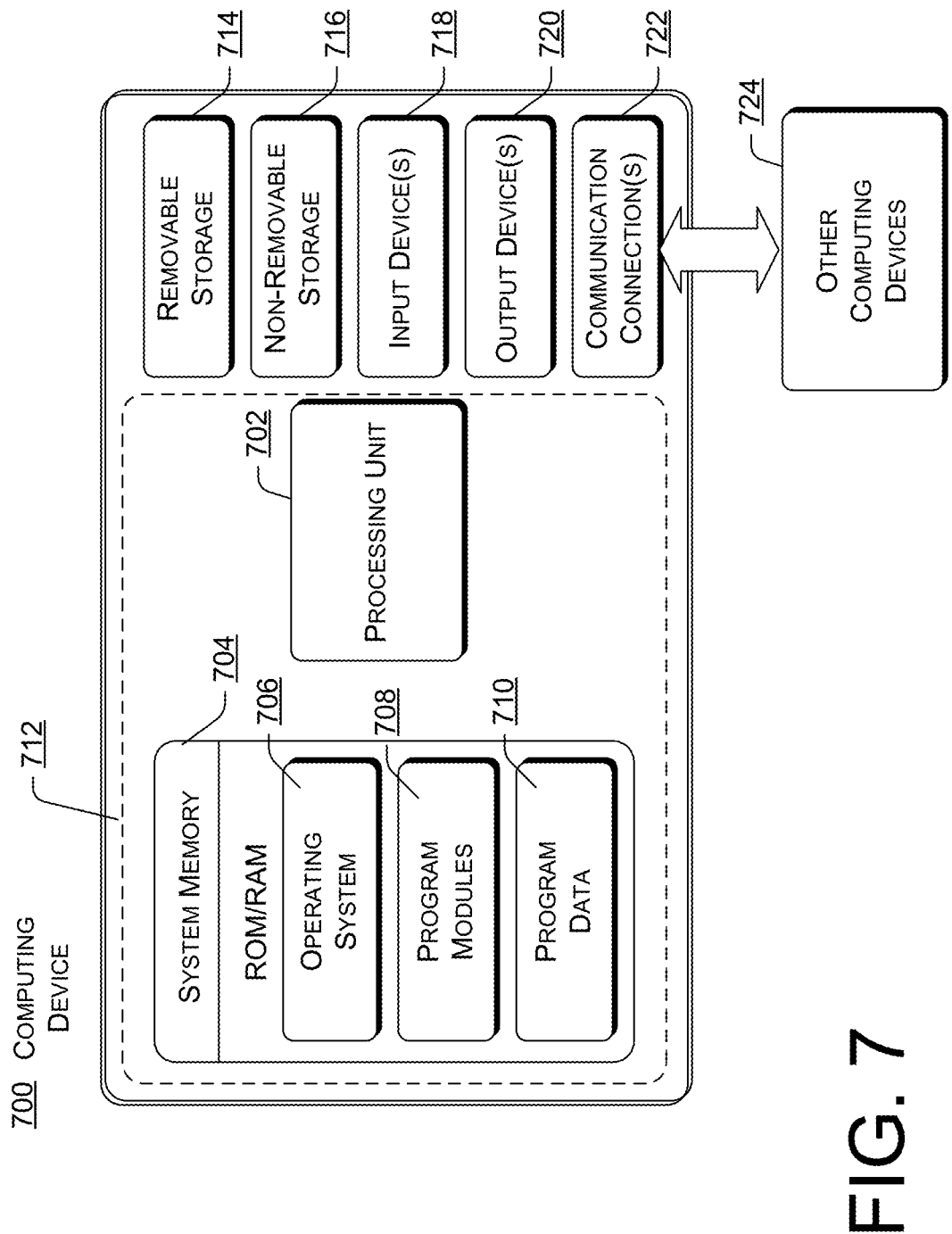
FIG. 7 is a block diagram that illustrates a representative computing device that may implement the map matching methods described herein, in accordance with various embodiments.

FIG. 7 illustrates a representative computing device 700 that may implement the map matching methods described herein, in accordance with various embodiments. The techniques and mechanisms described herein may be implemented by computing device 700 as well as by any other computing device, system, and/or environment. The computing device 700 shown in FIG. 7 is only one example of a computing device and is not intended to suggest any limitation as to the scope of use or functionality of any computing device utilized to perform the processes and/or procedures described above.

In at least one configuration, computing device 700 includes at least one processing unit 702 and system memory 704. Processing unit 702 may execute one or more modules and/or processes to cause computing device 700 to perform a variety of functions. In some embodiments, the processing unit 702 is a central processing unit (CPU), a graphics processing unit (GPU), both CPU and GPU, or other processing units or components known in the art.

Depending on the exact configuration and type of computing device, system memory 704 may be volatile (such as RAM), non-volatile (such as ROM, flash memory, miniature hard drive, memory card, or the like) or some combination thereof. System memory 704 may include an operating system 706, one or more program modules 708, and may include program data 710. The computing device 700 is of a very basic configuration demarcated by a dashed line 712. Again, a terminal may have fewer components but may interact with a computing device that may have such a basic configuration.

Computing device 700 may have additional features and/or functionality. For example, computing device 700 may also include additional data storage devices (removable and/or non-removable) such as, for example, magnetic disks, optical disks, or tape. Such additional storage is illustrated in FIG. 7 by removable storage 714 and non-removable storage 716. Computer storage media may include volatile and nonvolatile, removable, and non-removable media implemented in any method or technology for storage of information, such as computer readable instructions, data structures, program modules, or other data. System memory 704, removable storage 714 and non-removable storage 716 are all examples of computer storage media. Computer storage media includes, but is not limited to, RAM, ROM, EEPROM, flash memory or other memory technology, CD-ROM, digital versatile disks (DVD), or other optical storage, magnetic cassettes, magnetic tape, magnetic disk storage or other magnetic storage devices, or any other medium which can be used to store the desired information and which can be accessed by computing device 700. Any such computer storage media may be part of computing device 700. Computing device 700 may also have input device(s) 718 such as a keyboard, a mouse, a pen, a voice input device, a touch input device, etc. Output device(s) 720, such as a display, speakers, a printer, etc. may also be included.

Computing device 700 may also contain communication connections 722 that allow the device to communicate with other computing devices 724, such as over a network. These networks may include wired networks as well as wireless networks. Communication connections 722 may allow computing device 700 to communicate with various types of sensors utilizing a plurality of sensing modalities, such as GPS, Wi-Fi, and/or cell tower multilateration, inertial navigation, dead reckoning, or any combination thereof. Communication connections 722 may also allow computing device 700 to receive the location data described herein. Communication connections 722 are some examples of communication media. Communication media may typically be embodied by computer readable instructions, data structures, program modules, etc.

It is appreciated that the illustrated computing device 700 is only one example of a suitable device and is not intended to suggest any limitation as to the scope of use or functionality of the various embodiments described. Other well-known computing devices, systems, environments and/or configurations that may be suitable for use with the embodiments include, but are not limited to, personal computers, server computers, hand-held or laptop devices, multiprocessor systems, microprocessor-based systems, set top boxes, game consoles, programmable consumer electronics, network PCs, minicomputers, mainframe computers, distributed computing environments that include any of the above systems or devices, implementations using field programmable gate arrays ("FPGAs") and application specific integrated circuits ("ASICs"), and/or the like.

The implementation and administration of a shared resource computing environment on a single computing device may enable multiple computer users to concurrently collaborate on the same computing task or share in the same computing experience without reliance on networking hardware such as, but not limited to, network interface cards, hubs, routers, servers, bridges, switches, and other components commonly associated with communications over the Internet, as well without reliance on the software applications and protocols for communication over the Internet.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
receiving, via one or more communication connections of a computing device, first location data from a location measuring sensor and receiving second location data from the location measuring sensor;
in response to receiving at least one of the first location data or the second location data, determining, by one or more processors associated with the computing device, multiple routes between a first point corresponding to the first location data and a second point corresponding to the second location data;
assigning, by the one or more processors and to each of the multiple routes, a relative probability that each of the multiple routes corresponds to a location of the location measuring sensor based on a combination of a plurality of factors, the plurality of factors comprising:
a comparison between a direct distance between the first point and the second point and an actual distance between the first point and the second point for each of the multiple routes, the direct distance comprising a distance of a straight line spanning between the first point and the second point, the actual distance comprising a distance to be traveled using a route of the multiple routes between the first point and the second point; and
at least one of a total distance efficiency or a total time efficiency of a first route of the multiple routes relative to a second route of the multiple routes; and
predicting, by the one or more processors, that an entity associated with the location measuring sensor is traversing one of the multiple routes based, at least in part, on the relative probabilities assigned to each of the multiple routes.

2. The method of claim 1, wherein the relative probability is calculated based on the plurality of factors using a probabilistic model.

3. The method of claim 1, wherein the relative probability of a route being selected is inversely related to a distance between the direct distance and the actual distance.

4. The method of claim 1, further comprising disregarding a particular one of the multiple routes when a difference between the direct distance and an actual distance of the particular route exceeds a predetermined threshold.

5. The method of claim 1, wherein one of the plurality of factors is a difference between a time of an optimal route between the first point and the second point and a measured time taken between the first point and the second point.

6. The method of claim 1, wherein one of the plurality of factors is historical information known about an entity and/or historical information known about an environment or behavior in the environment.

7. The method of claim 1, wherein one of the plurality of factors is a complexity of a route through a network or a velocity of an entity.

8. The method of claim 1, the operations further comprising:
identifying at least one of a sensor type of the location measuring sensor or a type of environment associated with the first location data and the second location data; and
adjusting a sampling rate at which location data is received from the location measuring sensor based partly on at least one of the sensor type or the type of environment.

9. A system comprising:
a memory communicatively coupled to one or more processors;
one or more computer-executable instructions stored in the memory that when executed by the one or more processors cause the system to perform operations comprising:
determining one or more routes between a first point corresponding to a first location and a second point corresponding to a second location; and
assigning, to each of the one or more routes, a relative probability that an entity is currently traversing each of the one or more routes based on a plurality of factors, at least one of the plurality of factors comprising historical data associated with the entity traversing the one or more routes, the assigning comprising:
analyzing the historical data to identify a particular route between the first point and the second point that the entity has traversed at a previous time; and
based at least in part on identifying the particular route between the first point and the second point that the entity has traversed at the previous time, assigning to the particular route the relative probability that the entity is currently traversing the particular route.

10. The system of claim 9, wherein the first point and the second point are measured utilizing one of a plurality of types of sensors or other information sources.

11. The system of claim 9, wherein the relative probability is calculated based on the plurality of factors using a probabilistic model.

12. The system of claim 9, wherein one of the plurality of factors is a comparison between a direct distance between the first point and the second point and a total distance for each of the one or more routes.

13. The system of claim 12, wherein the relative probability of a route being selected is inversely related to a distance between the direct distance and the total distance.

14. The system of claim 12, wherein the operations further comprise disregarding a particular one of the one or more routes when a difference between the direct distance and a total distance of that route exceeds a predetermined threshold.

15. The system of claim 9, wherein one of the plurality of factors is a difference between a time of an optimal route between the first point and the second point and a measured time taken between the first point and the second point.

16. The system of claim 9, wherein the first point comprises a first input of data from a location measuring sensor and the second point comprises a second input of data from the location measuring sensor.

17. The system of claim 9, the plurality of factors further comprising efficiency data associated with a first route of the one or more routes; and
the assigning further comprising:
analyzing the efficiency data associated with the first route to determine at least one of a total distance to traverse the first route or total time to traverse the first route;
comparing the at least one of the total distance to traverse the first route or the total time to traverse the first route with at least one of a total distance to traverse a second route or a total time to traverse the second route of the one or more routes; and
based at least in part on the comparing, assigning to the first route the relative probability that the entity is currently traversing the first route.

18. One or more computer storage media including computer-executable instructions that, when executed by one or more processors, direct the one or more processors to perform operations comprising:
determining one or more routes between a first point corresponding to a first location and a second point corresponding to a second location;
assigning, to each of the one or more routes, a relative probability that an entity is traversing each of the one or more routes based on a combination of a plurality of factors, at least one of the plurality of factors comprising a traffic condition of the one or more routes;
calculating a direct distance between the first point and the second point, the direct distance comprising a distance of a straight line spanning between the first point and the second point; and
disregarding a particular route of the one or more routes when a difference between the direct distance and an actual distance of the particular route exceeds a predetermined threshold, the actual distance comprising a distance to be traveled using the particular route between the first point and the second point.

19. The computer storage media of claim 18, wherein the first point and the second point are measured utilizing one of a plurality of types of sensors or other information sources.

20. The computer storage media of claim 18, wherein the first point comprises a first input of data from a location measuring sensor and the second point comprises a second input of data from the location measuring sensor.

* * * * *